(12) United States Patent
Menendez

(10) Patent No.: US 12,285,382 B2
(45) Date of Patent: Apr. 29, 2025

(54) DETECTABLE WARNING SYSTEM

(71) Applicant: SAFETY STEP TD, INC., Redlands, CA (US)

(72) Inventor: Mike Menendez, Redlands, CA (US)

(73) Assignee: SAFETY STEP TD, INC., Redlands, CA (US)

( * ) Notice: Subject to any disclaimer, the term of this patent is extended or adjusted under 35 U.S.C. 154(b) by 0 days.

(21) Appl. No.: 18/731,160

(22) Filed: May 31, 2024

(65) Prior Publication Data
US 2024/0398655 A1 Dec. 5, 2024

Related U.S. Application Data

(60) Provisional application No. 63/505,990, filed on Jun. 2, 2023.

(51) Int. Cl.
*A61H 3/06* (2006.01)
*A47G 27/02* (2006.01)

(52) U.S. Cl.
CPC .......... *A61H 3/066* (2013.01); *A47G 27/0275* (2013.01)

(58) Field of Classification Search
None
See application file for complete search history.

(56) References Cited

U.S. PATENT DOCUMENTS

| 5,320,790 A | * | 6/1994 | Lowe | A61H 3/066 264/293 |
|---|---|---|---|---|
| 9,311,831 B2 | * | 4/2016 | Henshue | G09F 19/228 |
| 2009/0169297 A1 | | 7/2009 | Koehn | |
| 2013/0344303 A1 | | 12/2013 | Randall et al. | |

FOREIGN PATENT DOCUMENTS

CN 103343505 10/2013

OTHER PUBLICATIONS

International Search Report and Written Opinion received in International Application No. PCT/US2024/032110, mailed Oct. 10, 2024, 14 pages.

* cited by examiner

*Primary Examiner* — Christopher J Sebesta
*Assistant Examiner* — Katherine J Chu
(74) *Attorney, Agent, or Firm* — Knobbe Martens Olson & Bear LLP

(57) ABSTRACT

A detectable warning system comprising a mat substrate comprising a first acrylic material and a texture layer comprising a plurality of texture elements formed from a second acrylic material disposed on a top surface of the mat substrate. The mat substrate comprises a plurality of raised portions. The first acrylic material comprises an acrylic cement and an acrylic admix. The second acrylic material comprises the acrylic cement and the acrylic admix. The second acrylic material defines a plurality of texture elements on the mat substrate.

25 Claims, 18 Drawing Sheets

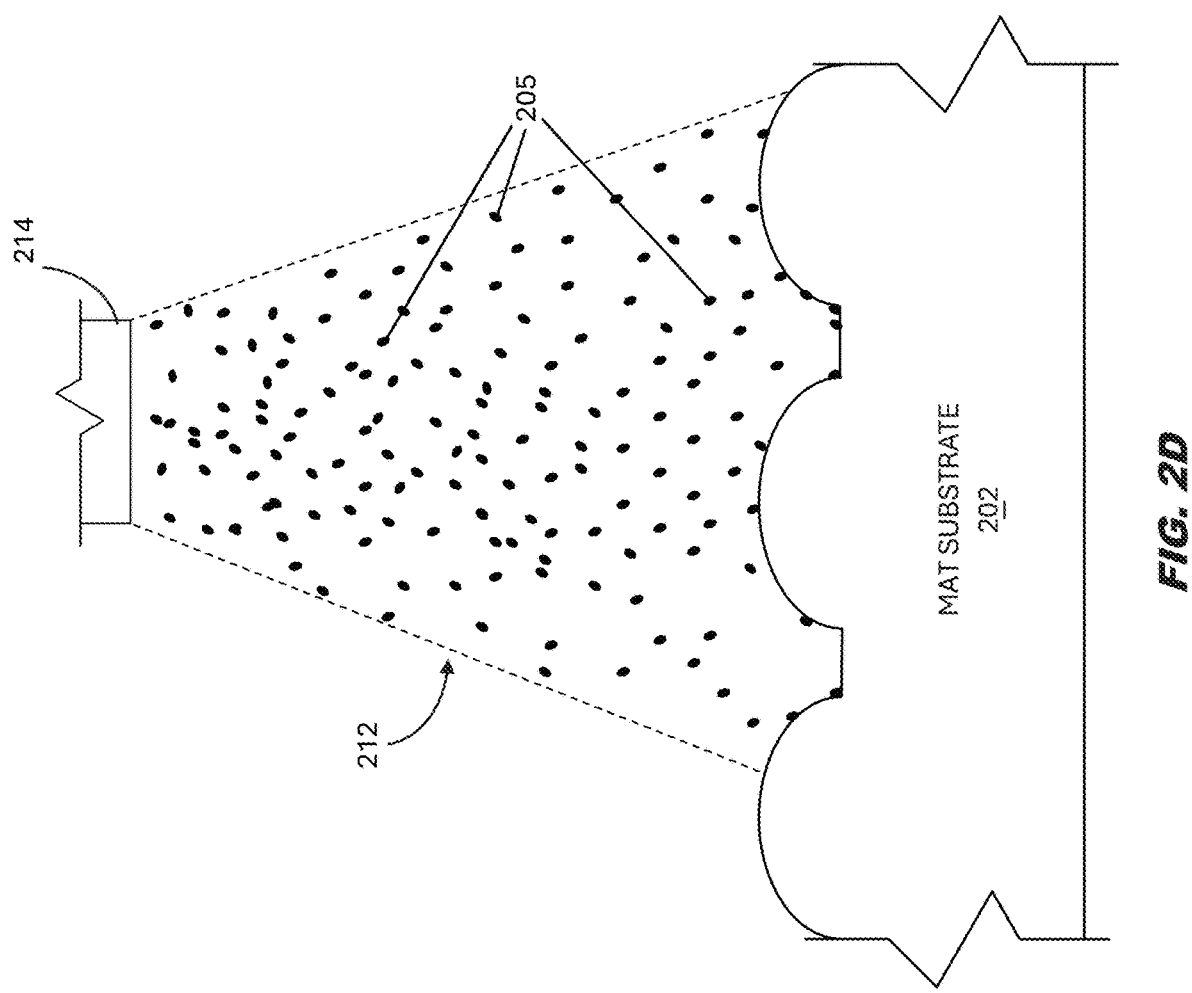

202

204

205

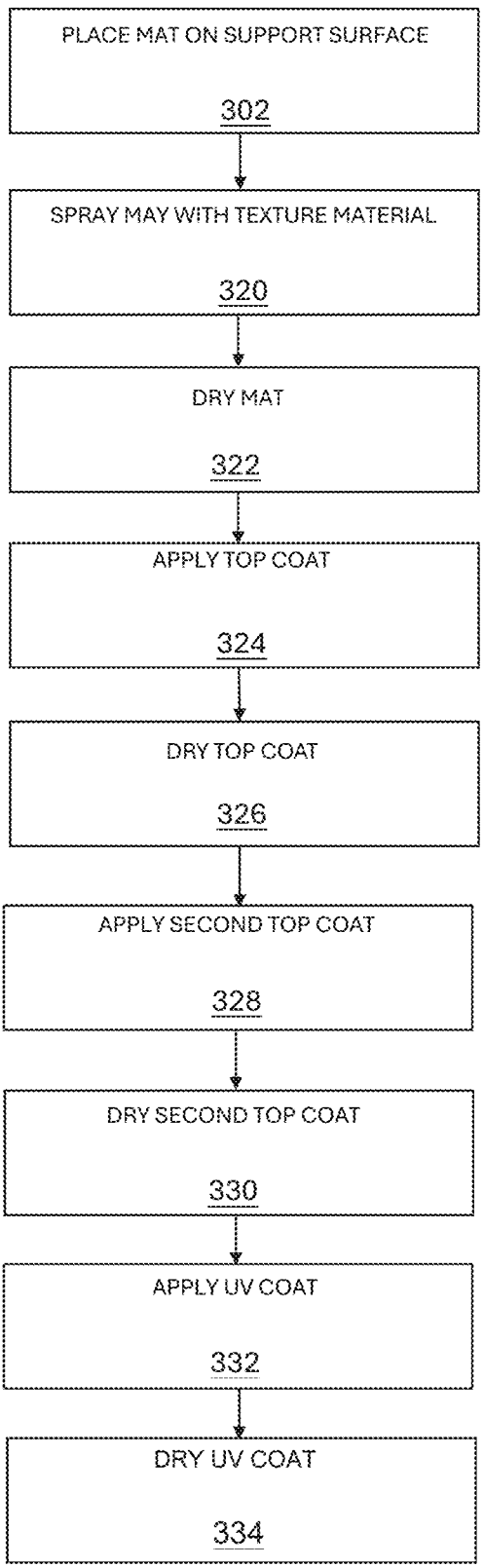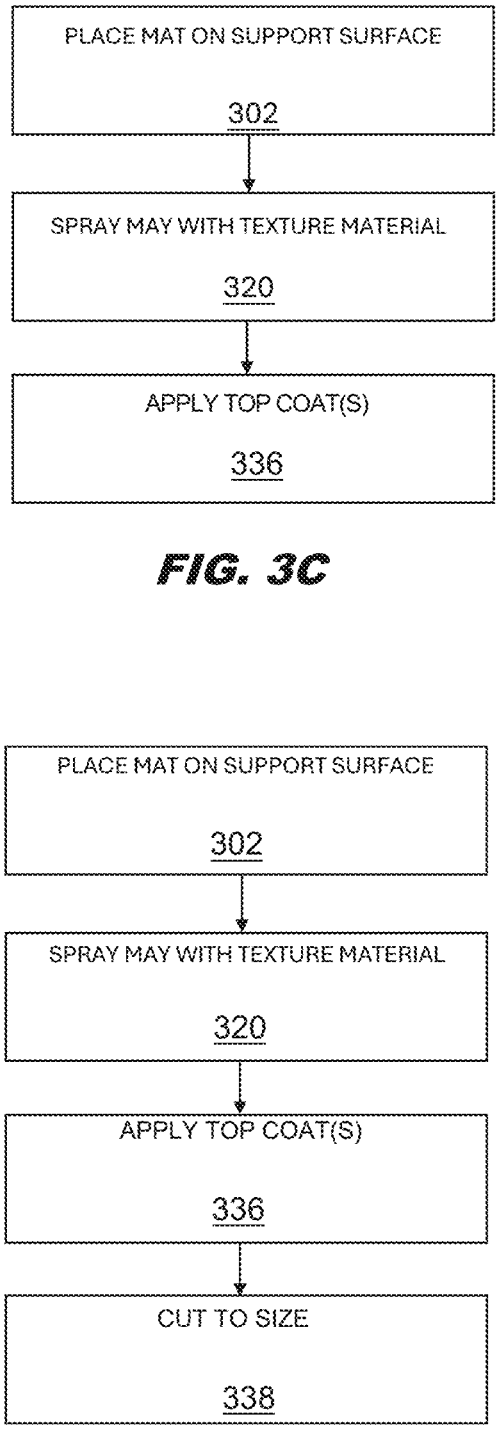
FIG. 3B
FIG. 3C
FIG. 3D

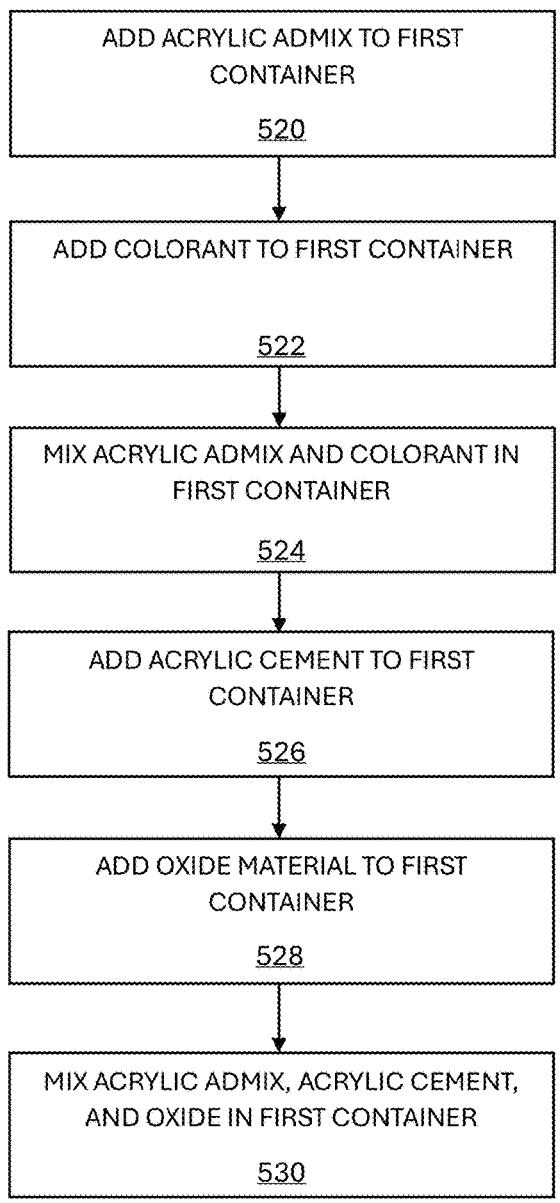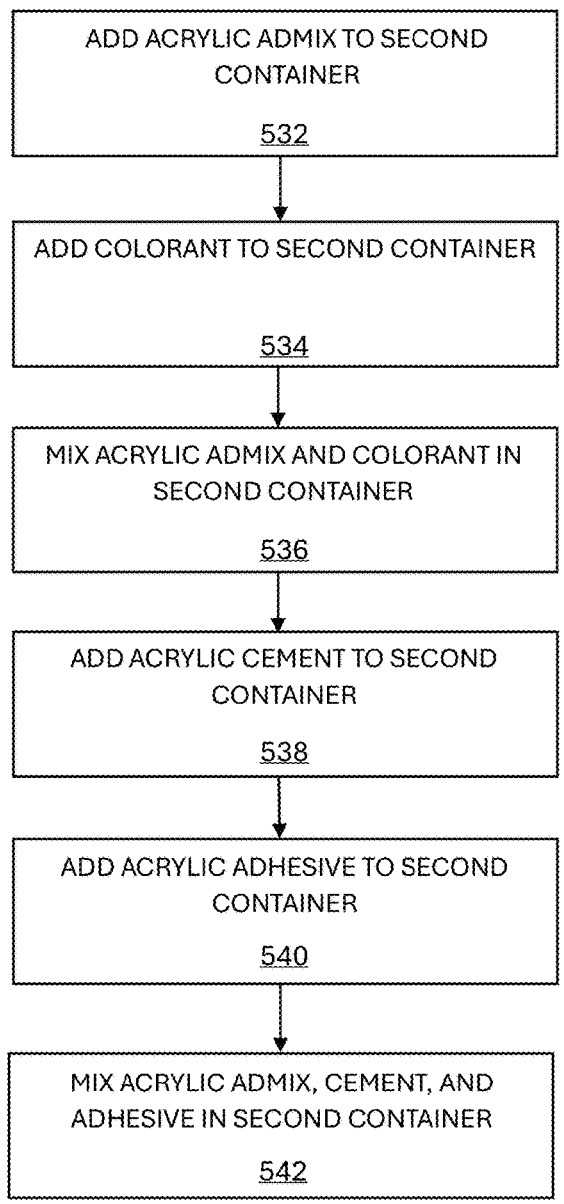
FIG. 5C
FIG. 5D

DETECTABLE WARNING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application claims the priority benefit of U.S. Provisional Application No. 63/505,990, filed Jun. 2, 2023, the entirety of each of which is hereby incorporated by reference herein.

BACKGROUND

Field

Embodiments of the present disclosure relate to detectable warning systems.

Description of the Related Art

Detectable warning systems can play an important role in making places accessible to those with disabilities, as well as providing other important benefits. For example, detectable warning systems can provide non-slip surfaces, visual and/or tactile indicators of boundaries, and so forth. In some cases, detectable warning systems may be mandated by regulatory bodies, for example regulatory bodies at the federal, state, or local level. For example, detectable warning systems may be required at boarding platforms, curb ramps, near stairs, escalators, crosswalks, wheelchair ramps, in parking garages, and so forth.

In some cases, regulations may impose various requirements on detectable warning systems. For example, regulations may specify that a safety warning system should have a surface comprising an arrangement of domes, may specify permissible dome size (e.g., height, diameter), spacing between domes, and so forth. Regulations may require particular colors for safety warning systems. For example, a safety warning system may be required to be provided in a color that contrasts with surrounding walking surfaces. In some cases, detectable warning systems can be slip-resistant to help avoid slipping or falling when walking on a detectable warning system. In some cases, regulations may specify slip resistance requirements. Even when not required by regulations, these and other features can provide numerous advantages.

Existing detectable warning systems are available in a variety of forms, for example as mats, sheets, bricks, and so forth. However, existing detectable warning systems can have many drawbacks. For example, installing detectable warning systems can be relatively complex, labor-intensive, and present hazards to installation personnel. In some cases, potentially hazardous materials may be used. For example, when providing a non-slip surface, workers at a construction site may apply an adhesive material and spray sand on a detectable warning system surface. While this can be an effective means of providing a non-slip surface, it can have several drawbacks. The process can be labor intensive, inefficient, messy, and potentially hazardous. For example, the process can, in some cases, result in airborne crystalline silica that can be present in sand that can be inhaled and penetrate deep into the lungs. Exposure to airborne crystalline silica has been linked to increased rates of lung cancer.

Existing detectable warning systems are affixed or embedded in a concrete or paved surface. Some existing detectable warning systems include cast-in-place tiles. For example, concrete can be poured and smoothed prior to the installation of a detectable warning system. The detectable warning system can then be aligned relative to the wet concrete. The detectable warning system can then be pressed into the wet concrete such that the top surface of the detectable warning system is flush with a surface of the wet concrete. For example, workers may use a mallet to apply a force to the detectable warning system for driving the detectable warning system into the wet concrete. Some existing detectable warning systems include anchors that can further penetrate the wet concrete such that they can be embedded. The detectable warning system can then be secured as the concrete cures. Some existing detectable warning systems can include replacement detectable warning panels which may be used due to surface damage. For example, a lower frame panel forming a base can be embedded in the concrete or pavement walkway when it is laid. The walking surface can be a top removable tactile warning panel positioned over and is fastened into or on the base panel.

Some existing detectable warning systems include surface-applied tiles. For example, existing detectable warning systems can be secured to a cured concrete slab and/or paved surface. These existing detectable warning systems can be bonded to the cured concrete slab and/or paved surface via an adhesive. Some existing detectable warning systems include an adhesive while some existing detectable warning systems require the use of another adhesive or bonding agent. Some methods of securing a surface-applied tile can include scuffing the cured concrete slab and/or paved surface prior to bonding the detectable warning system to the cured concrete slab and/or paved surface. The cured concrete slab and/or paved surface can be cleaned to remove any debris. Further steps may be implemented to secure the detectable warning system to the cured concrete or paved surface. For example, anchors can be embedded into the cured concrete slab or paved surface by drilling into the cured concrete slab or paved surface and driving an anchor bolt into the drilled hole and/or by applying another bonding agent around the perimeter of the detectable warning system.

Some methods for installing existing detectable warning systems can include preparing a surface of a concrete slab or paved surface for installation, preparing a detectable warning system for installation, applying an adhesive or bonding agent to the concrete slab or paved surface, placing the detectable warning system onto the adhesive or bonding agent, applying pressure to the detectable warning system to compress the detectable warning system into the adhesive or bonding agent, sealing the edges of the detectable warning system, applying an adhesive or bonding agent to a top surface of the detectable warning system, applying an abrasive material (e.g., sand) onto the adhesive or bonding agent, removing excess abrasive material that is not adhered or bonded to the detectable warning system, and applying one or more top coat layers. Preparing a surface of a concrete slab or paved surface for installation can include cleaning a surface area to remove debris and dust. For example, by using a broom, brush, and/or air blower to remove debris. Preparing a surface of a concrete slab or paved surface for installation can further include placing tape or masking around the perimeter of the target site for the detectable warning system. Preparing a detectable warning system for installation can include cutting a preformed mat to an appropriate size. Preparing a detectable warning system for installation can further include cleaning a bottom surface of the detectable warning system of debris. Applying one or more top coat layers can include evenly applying one or more colorant layers (e.g., paint) to the dried abrasive material bonded to the top layer of the mat of the detectable warning system. Applying one or more top coat layers can further include evenly applying one or more sealant layers on top of the dried colorant layers.

Thus, detectable warning systems can play an important role in accessibility. However, current detectable warning systems have several problems. For example, installing existing detectable warning systems are labor intensive, time consuming, and present risks of inhaling fine particulate matter that may negatively impact a laborer's health. Accordingly, there is a need for improved detectable warning systems.

SUMMARY OF SOME EXAMPLE EMBODIMENTS

The systems, methods, and devices described herein each have several aspects, no single one of which is solely responsible for its desirable attributes. Without limiting the scope of this disclosure, several non-limiting features will now be described briefly. After considering this discussion, and particularly after reading the Detailed Description, the skilled artisan will understand how the features of the embodiments described herein provide advantages over existing combustion engine systems and methods for customizing and manufacturing the same.

Disclosed herein are embodiments of a detectable warning system. In some embodiments, a detectable warning system can include: a mat substrate including a first acrylic material; a texture layer including a second acrylic material; and an ultraviolet (UV) protective sealing layer, wherein: the texture layer is disposed on a top surface of the mat substrate, and the ultraviolet protective layer is disposed on a top surface of the texture layer.

Any embodiments of the detectable warning system can include, in additional embodiments, one or more of the following features, components, and/or details, in any combination with any of the other features, components, and/or details of any other embodiments described herein: wherein the texture layer does not include any sand.

Any embodiments of the detectable warning system can include, in additional embodiments, one or more of the following features, components, and/or details, in any combination with any of the other features, components, and/or details of any other embodiments described herein: wherein the detectable warning system can further comprise a first top coat layer and a second top coat layer, wherein the first top coat layer is disposed directly on a top surface of the texture layer, and wherein the second top coat layer is disposed directly on a top surface of the first top coat layer; wherein the texture layer further includes a second colorant having a second color; wherein the first color is the same as the second color; wherein the first color is selected from one of yellow, red, blue, black, dark gray, or light gray, and wherein the second color is select from one of yellow, red, blue, black, dark gray, or light gray; wherein the top surface of the mat substrate includes a plurality of raised portions; wherein the plurality of raised portions includes domes or truncated domes; wherein the plurality of raised portions are arranged in a linear grid; and/or wherein the detectable warning system is configured to be in a rolled form.

Also disclosed herein are embodiments of methods for making a detectable warning system. In some embodiments, a method can include: preparing a texture element mixture including an acrylic cement and an acrylic admix; spraying the texture element mixture on a top surface of a mat substrate, the mat substrate including an acrylic material; and drying the texture element mixture.

Any embodiments of the method can include, in additional embodiments, one or more of the following features, components, details, and/or steps, in any combination with any of the other features, components, details, and/or steps of any other embodiments described herein: wherein a ratio of the acrylic cement and the acrylic admix is about three parts acrylic cement to about one part acrylic admix; wherein the texture element mixture further includes water; wherein the texture element mixture is sprayed from a sprayer having an air pressure about 80 psi, and wherein a distance from the sprayer to the mat substrate is about 36 inches; wherein the method further includes applying a first top coat layer; drying the first top coat layer; applying a second top coat layer; drying the second top coat layer; applying an ultraviolet (UV) protective layer; and drying the UV protective layer; wherein the top surface of the mat substrate includes a plurality of raised portions; wherein the plurality of raised portions includes domes or truncated domes; and/or wherein the method further includes rolling the detectable warning system into a rolled state.

In some aspects, the techniques described herein relate to a detectable warning system including: a mat substrate including a first layer including acrylic cement, acrylic admix, and aluminum oxide and a second layer including the acrylic cement and the acrylic admix but not the aluminum oxide; and a texture layer including a plurality of texture elements formed from a second acrylic material disposed on a top surface of the mat substrate; and wherein: the mat substrate includes a plurality of raised portions; the first acrylic material includes an acrylic cement and an acrylic admix; the second acrylic material includes the acrylic cement and the acrylic admix; and the plurality of texture elements include texture elements that are of a variety of different sizes and shapes positioned about an upper surface of the mat substrate.

In some aspects, the techniques described herein relate to a detectable warning system, wherein the texture layer does not include any sand. In some aspects, the techniques described herein relate to the detectable warning system of any one of the previous claims, wherein the plurality of texture elements include only the acrylic cement and the acrylic admix. In some aspects, the techniques described herein relate to the detectable warning system of any one of the previous claims, further including: a first top coat layer; and a second top coat layer, wherein the first top coat layer is disposed directly over the texture layer, and wherein the second top coat layer is disposed directly over the first top coat layer. In some aspects, the techniques described herein relate to a detectable warning system, wherein the plurality of raised portions includes domes or truncated domes arranged in a linear grid. In some aspects, the techniques described herein relate to a detectable warning system, including a paint layer. In some aspects, the techniques described herein relate to a detectable warning system, further including an ultraviolet (UV) protective sealing layer disposed on a top surface of the texture layer.

In some aspects, the techniques described herein relate to a method for making a detectable warning system including: providing a mat substrate made from a first acrylic material and including a plurality of raised features on a support surface of a fabrication facility; preparing a texture element mixture including a second acrylic material; and applying the texture element mixture to a top surface of the mat substrate to form a plurality of texture elements about an upper surface of the mat substrate; wherein: the first acrylic material includes an acrylic cement and an acrylic admix; the second acrylic material includes the acrylic cement and the acrylic admix; and the texture element mixture does not include any sand.

In some aspects, the techniques described herein relate to a method, wherein applying the texture element mixture to a top surface of the mat substrate includes spraying the texture element mixture onto a top surface of the mat substrate to form the plurality of texture elements on the top surface of the mat substrate. In some aspects, the techniques described herein relate to a method, wherein the second acrylic material includes an acrylic cement and an acrylic admix. In some aspects, the techniques described herein relate to a method, wherein a ratio of the acrylic cement and the acrylic admix is about three parts acrylic cement to about one part acrylic admix. In some aspects, the techniques described herein relate to a method, wherein the texture element mixture is sprayed from a sprayer having an air pressure about 80 psi, and wherein a distance from the sprayer to the mat substrate is at least about 36 inches. In some aspects, the techniques described herein relate to a method, further including: applying a first top coat layer; after the first top coat layer has dried, applying a second top coat layer; and after the second top coat layer has dried, applying an ultraviolet (UV) protective layer. In some aspects, the techniques described herein relate to a method, wherein the plurality of raised portions includes domes or truncated domes. In some aspects, the techniques described herein relate to a method, further including: rolling the detectable warning system into a rolled state. In some aspects, the techniques described herein relate to a method, wherein the texture element mixture bonds with the mat substrate.

In some aspects, the techniques described herein relate to a mat substrate including: a top surface including a plurality of raised portions; a first acrylic layer including an acrylic cement, an acrylic admix, and an oxide material; and a second acrylic layer including the acrylic cement and the acrylic admix; wherein the first acrylic layer defines the top surface and the second acrylic layer is configured to be positioned below the first acrylic layer when the mat substrate is in an operable position.

In some aspects, the techniques described herein relate to a mat substrate, wherein the plurality of raised portions includes domes or truncated domes. In some aspects, the techniques described herein relate to a mat substrate, wherein the first acrylic layer is harder than the second acrylic layer. In some aspects, the techniques described herein relate to a mat substrate, wherein the second acrylic layer is flexible.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2D is a cross-section view that illustrates texture element mixture being applied to a mat substrate.

FIGS. 2I-2L illustrate the detectable warning system of FIGS. 2E-2G.

FIG. 3B is a flowchart that illustrates an example process for making a detectable warning system according to some embodiments.

FIG. 3C is a flowchart that illustrates an example process for making a detectable warning system according to some embodiments.

FIG. 3D is a flowchart that illustrates an example process for making a detectable warning system according to some embodiments.

FIG. 5C is a flow chart that illustrates an example process for making an acrylic mixture.

FIG. 5D is a flowchart that illustrates an example process for making an acrylic mixture.

DETAILED DESCRIPTION OF SOME EMBODIMENTS

Figure 1A:
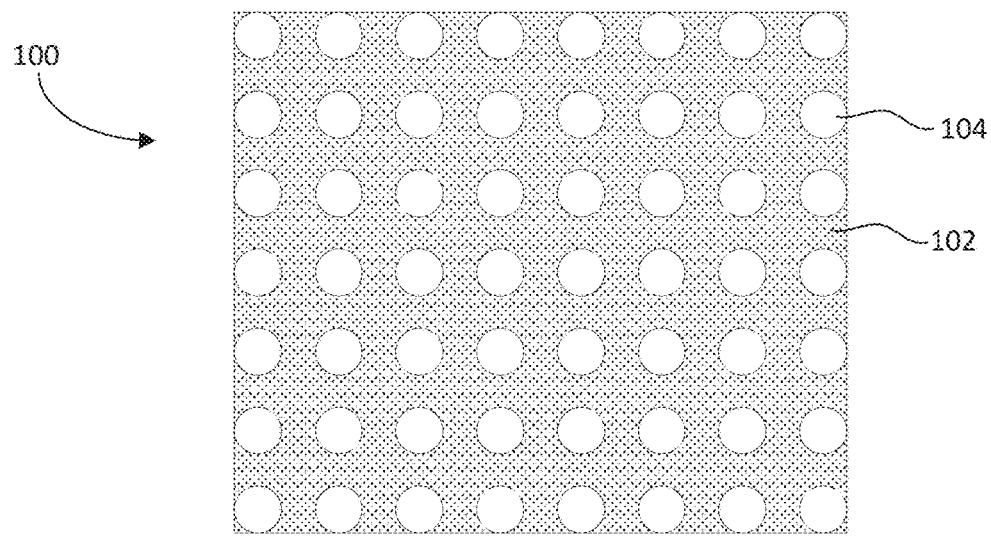
FIGS. 1A-1B illustrate, respectively, top and side views of a detectable warning system according to some embodiments.

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments. However, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

It is desirable to provide detectable warning systems that reduce the labor required at a work site, reduce or eliminate the use of potentially harmful compounds or materials, reduce or eliminate exposure to potentially harmful compounds or materials, and/or confine the use of potentially harmful compounds to areas where their spread can be well-controlled, such as in a manufacturing facility. According to some embodiments described herein, detectable warning systems can be provided that are relatively simple to install and that avoid the use of sand.

Some embodiments of a detectable warning system disclosed herein can include an acrylic mat. In some embodiments, a non-slip surface can be provided by spraying or splatter-coating the acrylic mat with additional coatings, which coatings can include acrylic materials. In some embodiments, the mat, sprayed or splatter-coated material, or both can be colored. In some embodiments, the finished detectable warning system can have a uniform color throughout (e.g., without limitation, across the entire visible surface of the system and/or through one or more or all wearable layers of the system) such that the color remains visible even as the surface wears, which can extend the lifetime of the detectable warning system. In some embodiments, the detectable warning system may have a varied or non-uniform color throughout all or a portion of the system. For example, a first colorant can be used for a first, exposed portion or layer of the detectable warning system, and a second colorant can be used for a second, non-exposed portion or layer of the detectable warning system. As the exposed surface wears, the second portion that is colored with the second colorant can become exposed. In some embodiments, exposure of the second colorant can indicate that the detectable warning system has become worn and/or should be replaced. In some embodiments, other layers or portions of the detectable warning system can have no colorant or other colorants. Alternatively, in some embodiments, a first colorant can be used for the first, second and/or other layers or portions of the detectable warning system.

In some embodiments, a detectable warning system can be provided as a flat mat that can be installed at a destination without further processing on site aside from, for example, cutting the mat so that the mat fits in a desired area. In some embodiments, a detectable warning system can be provided as a flat mat that can be installed at a destination with very little further processing on site aside including, for example, adding a color layer and/or a protective layer (e.g., a UV protective layer). In some embodiments, a detectable warning system can be provided in the form of a rolled mat. Flat mats and rolled mats can provide various advantages. For example, a flat mat can be shipped to a job site in a finished state, thereby simplifying installation. A finished state may correspond to a prefabricated detectable warning system having already undergone receiving a texture layer and one or more top coat layers. Thus, the prefabricated detectable warning system can be adhered and/or bonded to a cement slab and/or paved surface. A rolled mat can typically be larger and have improved aesthetics for larger installations or for installations where customized shapes are desired. Any embodiments of the detectable warning systems disclosed herein can be provided in a variety of shapes, configurations, and/or sizes. For example, a flat mat can be provided in sizes of, for example, of about 3 feet by about 4 feet, for example 3 feet by 4 feet, about 3 feet by about 5 feet, for example 3 feet by 5 feet, about 2 feet by about 4 feet, for example 2 feet by 4 feet, about 2 feet by about 5 feet, for example 2 feet by 5 feet, or any other desired size or size that is suitable for transport to an installation site. A rolled mat can be provided in a variety of sizes. For example, a rolled mat can be provided with dimensions of about 2 feet by about 10 feet, for example 2 feet by 10 feet, about 3 feet by about 10 feet, for example 3 feet by 10 feet, or any other size as desired. Generally, for larger sizes of mats, a rolled mat can be easier to ship or transport than a flat mat. In some embodiments, a rolled mat may not have a top color coat or a UV coating applied prior to shipping to an installation site, and/or such coatings can be applied after the mat is installed.

In some embodiments, a substrate surface (e.g., concrete or asphalt) may undergo significant preparation before a detectable warning system is installed. For example, material can be removed to provide a cavity into which the detectable warning system can be placed. The detectable warning system can be affixed to an underlying surface by a variety of means, for example using screws, bolts, adhesives, and so forth. In some embodiments, a detectable warning system can include a mat having a bottom surface with an adhesive material disposed thereon. A protective layer can be placed over the adhesive material. The protective layer can be removed, and the detectable warning system can be applied to an existing surface such as asphalt, concrete, and so forth.

Figure 1B:
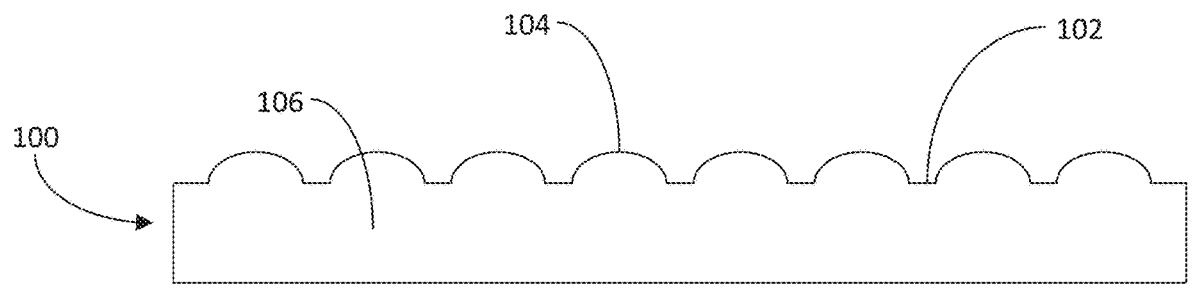
Figure 1C:
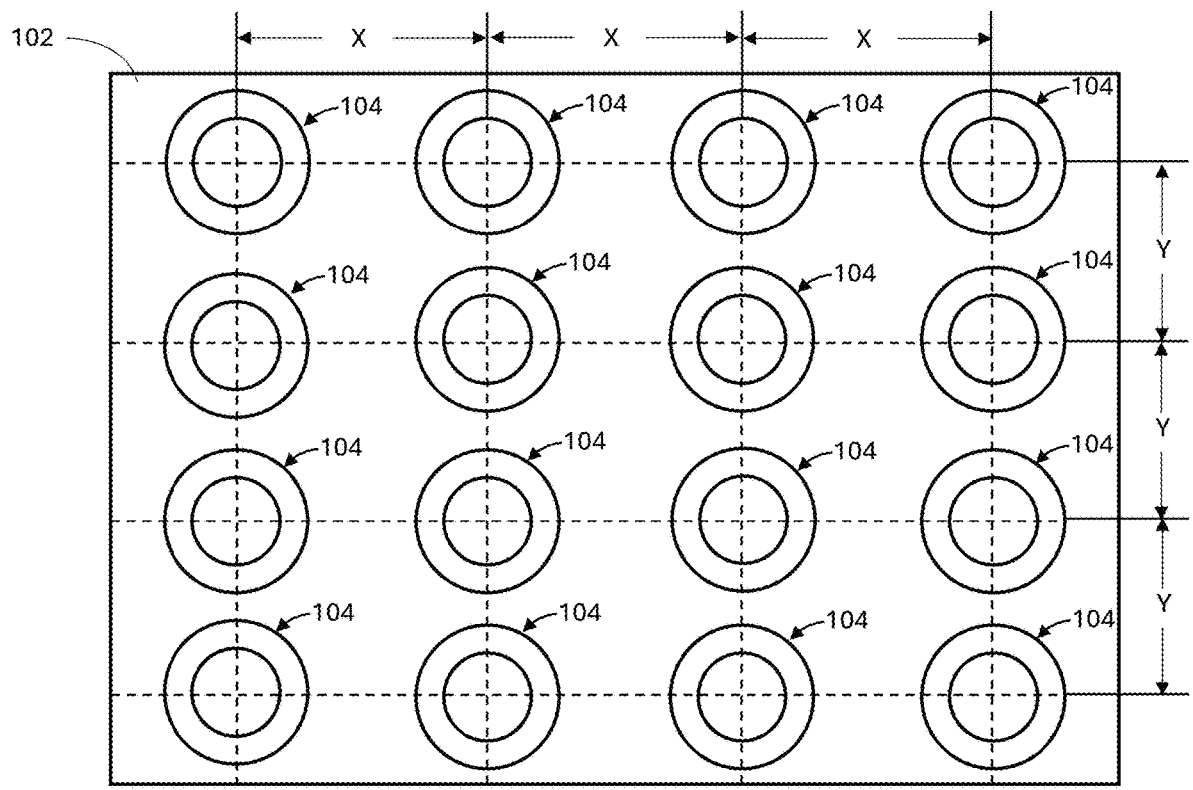
FIG. 1C illustrates a top view of a detectable warning system according to some embodiments.

FIGS. 1A-1B illustrate, respectively, top and side views of a detectable warning system according to some embodiments. As shown in FIGS. 1A-1B, a detectable warning system 100 can have a top surface 102 with a plurality of raised portions 104 disposed thereon. The top surface 102 can be a top surface of a base layer 106. When installed, the top surface 102 and the plurality of raised portions 104 can be exposed and can operate as a walking surface. It will be appreciated that the pattern of the plurality of raised portions 104 can differ from that shown in FIG. 1A. For example, in some embodiments, the plurality of raised portions 104 can be arranged in a linear grid, hexagonal pattern, randomly, and so forth. In some embodiments, the plurality of raised portions 104 can comprise domes, truncated domes, cones, truncated cones, or any other desired shape. For example, in any embodiments disclosed herein, the top surfaces of domes can be flattened to provide truncated domes. In some embodiments, the sides of the truncated domes can be straight as shown in FIG. 1C or can be curved. In some embodiments, the sides of the domes can be straight.

The detectable warning system 100 illustrated in FIGS. 1A-1B does not have a non-slip surface treatment applied, at least not to the surfaces of the raised portions 104. However, in some embodiments, a non-slip surface treatment can be provided, for example using sand, acrylic, or another suitable material.

Figure 1D:
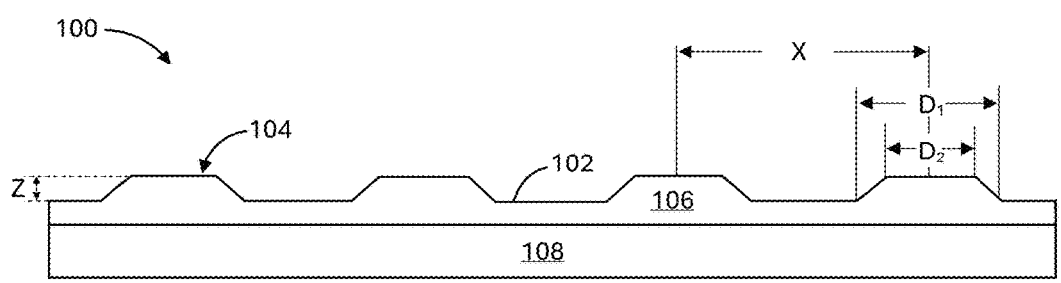
FIG. 1D illustrates a cross-section view of a detectable warning system according to some embodiments.

FIGS. 1C-1D illustrate, respectively, top and side views of a detectable warning system 100 according to some embodiments. As shown in FIG. 1C, in some embodiments, a plurality of raised portions 104, which can be truncated domes, have a spherical outer surface, or otherwise, can be arranged in a grid pattern with a first center-to-center spacing X and a second center-to-center spacing Y. The first center-to-center spacing X can range from 1 inch to 4 inches, or about 1 inch to about 4 inches, or 2.35 inches or about 2.35 inches. In some embodiments, the second center-to-center spacing Y can range from 1 inch to 4 inches, or about 1 inch to about 4 inches, or 2.35 inches or about 2.35 inches. The second center-to-center spacing Y can be the same or similar to the first center-to-center spacing X. The plurality of raised portions 104 can have a base diameter D1 of, for example, from 0.5 inches to 1.5 inches, or about 0.5 inches to about 1.5 inches, or 0.9 inches or about 0.9 inches to 0.92 inches or about 0.92 inches. The plurality of raised portions 104 can have an upper diameter D2 of, for example, from 0.2 inches to 0.7 inches, or about 0.2 inches to about 0.7 inches, for example about 0.45 inches to about 0.47 inches. The base diameter D1 can be larger than the upper diameter D2. The plurality of raised portions 104 can have a height Z of, for example, from 0.1 inches to 0.4 inches, or about 0.1 inches to about 0.4 inches, or 0.2 inches or about 0.2 inches. The detectable warning system can be affixed to an underlying substrate 108 such as, for example, concrete or asphalt.

Figure 2A:
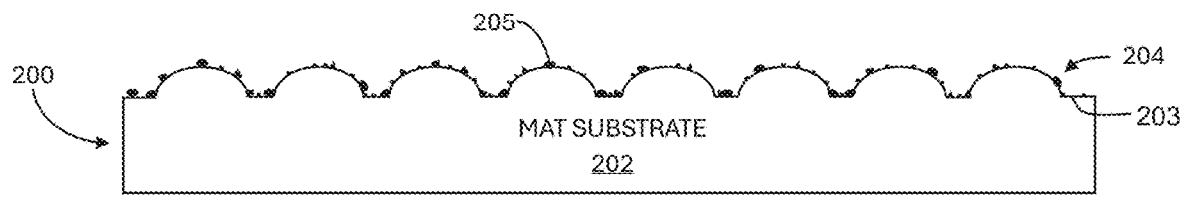
FIG. 2A illustrates a cross-section view of a textured detectable warning system according to some embodiments.

FIG. 2A illustrates a cross-section view of a textured detectable warning system according to some embodiments. The detectable warning system 200 can include a mat substrate 202 and a texture layer 204.

In some embodiments, the mat substrate 202 can be the same or similar to the detectable warning system 100, or can have any of the same components, features, materials, sizes, shapes, and/or other details of any of the embodiments of the detectable warning system 100 disclosed herein. In some embodiments, the mat substrate 202 may be the same or similar to the mat substrate 500 described below. The mat substrate 202 can include a top surface 203. The top surface 203 can include a plurality of raised features or protrusions, which can be domes, truncated domes, truncated cones, or have any other desired shape. In some embodiments, the top surface 203 can be the same or similar to the top surface 102. In some embodiments, the mat substrate 202 can be rigid. In other embodiments, the mat substrate 202 can be flexible or semi-flexible. A flexible or semi-flexible mat substrate 202 can be desirable in some applications. For example, a flexible or semi-flexible mat substrate 202 can be used when a detectable warning system 200 is to be installed on a surface that is not completely flat, such as may be encountered in some crosswalks, ramps, and so forth. Another benefit of a flexible or semi-flexible mat substrate is that the mat substrate can more easily be rolled up for transport or shipping.

The mat substrate 202 can include one or more acrylic materials. In some embodiments, the mat substrate 202 can be formed of an acrylic plastic sheet. In some embodiments, the one or more acrylic materials can include an acrylic cement and/or an acrylic admix. In some embodiments, the one or more acrylic materials can further include an acrylic adhesive. In some embodiments, the mat substrate 202 can include an oxide material.

The acrylic cement can be configured to mix with a liquid to form a solid structure. The acrylic cement can be a powder. The acrylic cement can solidify after mixing with a liquid and curing. In some embodiments, the acrylic cement can include powdered limestone and crystalline silica. For example, the acrylic cement may include a mixture of hydraulic lime and crystalline silica. In some embodiments, the acrylic cement may be a mixture of Portland Cement and crystalline silica. In some embodiments, Portland Cement may be 30-70 percent of the mixture. In some embodiments, crystalline silica may be 30-70 percent of the mixture. In some embodiments, the acrylic cement may be 30 percent or about 30 percent Portland Cement and 70 percent or about 70 percent crystalline silica. In some embodiments, the acrylic cement may be 70 percent or about 70 percent Portland Cement and 30 percent or about 30 percent crystalline silica. In some embodiments, the acrylic cement may be 50 percent or about 50 percent Portland Cement and 50 percent or about 50 percent crystalline silica. In some embodiments, Portland Cement and/or crystalline silica may be any of the values, approximate values, or ranges of values, or approximate values, of the foregoing ranges. For example, the acrylic cement may be 1260-0165 Safety Step Dry Powder 100LB from Omega Products International.

The acrylic admix can be an acrylic emulsion configured to be added as a bonding agent to bond the cement and strengthen the mat substrate. The acrylic admix can create a surface that is resistant to most chemicals, acids, water, and weather. The acrylic admix can improve curing qualities and can reduce shrinkage cracking. In some embodiments, the acrylic admix can include an acrylic polymer, a residual monomer, an aqua ammonia, and water. In some embodiments, the acrylic admix may be 47 percent or about 47 percent acrylic polymer, 0.05 percent or about 0.05 percent residual monomer, about 0.02 percent or about 0.2 percent aqua ammonia, and 53 percent or about 53 percent water. In some embodiments, the acrylic admix may be 40-48 percent acrylic polymer, less than 0.05 percent residual monomer, at most 0.2 percent aqua ammonia, and between 52 and 60 percent water. In some embodiments, the acrylic admix may have at most 48 percent acrylic polymer, at most about 0.05 percent residual monomer, at most 0.02 percent aqua ammonia, and at least 52 percent water. In some embodiments, acrylic polymer, residual monomers, aqua ammonia, and/or water may be any of the values, approximate values, or ranges of values, or approximate values, of the foregoing ranges. For example, in some embodiments, the acrylic admix may be RHOPLEX MC-76. For example, RHOPLEX MC-76 IBC700 LIQ from Univar Solutions.

The acrylic adhesive can be an acrylic emulsion. In some embodiments, the acrylic adhesive can be an emulsion of water and an acrylic polymer. The acrylic adhesive can provide flexibility to a cured substrate. For example, the acrylic adhesive may be 1589SS-HVCLR-TOTE from Life-Paint.

The oxide material can be an additive for strengthening and hardening the mat substrate 202. In some embodiments, the oxide material can be a metal oxide. For example, the oxide material can be aluminum oxide. Aluminum oxide can resist weathering. Additionally, aluminum oxide can strengthen the mat substrate thereby prolonging the life of the mat substrate 202. For example, the oxide material may be able to withstand repeated compressive forces applied during years of use along a pedestrian walkway. In some embodiments, the oxide material can be #30/54 White Lightning Abrasive Media from Kleen Blast.

In some embodiments, the mat substrate 202 may include different layers of acrylic materials. For example, a first acrylic material may form a first layer (which can be the uppermost layer, when the mat substrate is in an operable position) and a second acrylic material may form a second layer (which can be closer to the ground or supporting surface compared to the first layer, when the mat substrate is in the operable position), as described below regarding FIG. 5A.

Some embodiments of the mat substrate 202 can include more acrylic cement than acrylic admix. In some embodiments, the acrylic cement and acrylic admix can be included in a desired ratio. For example, the mat substrate 202 can include a ratio of from 2:1 acrylic cement to acrylic admix to 5:1 acrylic cement to acrylic admix, or about 2:1 acrylic cement to acrylic admix to about 5:1 acrylic cement to acrylic admix, for example 2:1, 3:1, 4:1, or 5:1 acrylic cement to acrylic admix or about 2:1, about 3:1, about 4:1, or about 5:1 acrylic cement to acrylic admix. In some embodiments, the ratio can preferably be 3:1 or about 3:1 acrylic cement to acrylic admix. In some embodiments, a mat substrate 202 can include 7.5 pounds of acrylic cement and 2.25 pounds of acrylic admix. In some embodiments, the mat substrate 202 can include less than three times the amount of acrylic cement than acrylic admix. For example, a mat substrate 202 can include 7 pounds of acrylic cement and 2.5 pounds of acrylic admix.

In some embodiments, as mentioned, a plurality of texture elements 205 can be added over all or a portion of the mat substrate 202. In some embodiments, the plurality of texture elements 205 can completely cover the mat substrate 202. In some embodiments, the plurality of texture elements 205 may not completely cover the mat substrate 202 (e.g., can cover a portion of or less than the entire mat substrate 202). The plurality of texture elements 205 can be positioned along or about a top surface 203 of the mat substrate 202 to increase a gripping surface of the detectable warning system 200. In some embodiments, the plurality of texture elements 205 can collectively be referred to as a texture layer 204. The plurality of texture elements 205 can include an acrylic material. Accordingly, the plurality of texture elements 205 can be chemically bonded to the top surface of the mat substrate 202. The plurality of texture elements 205 can be configured to provide a non-uniform surface to the top surface 203 of the mat substrate 202. In some embodiments, each of the plurality of texture elements 205 may be a discrete nodule deposited about the top surface 203 of the mat substrate 202. For example, the plurality of texture elements 205 can be formed in various sizes and shapes protruding from the top surface 203 of the mat substrate 202. Thus, the plurality of texture elements 205 can provide a gripping surface to the mat substrate 202. The gripping surface can increase a friction coefficient of the mat substrate 202. For example, the gripping surface can have a static coefficient of friction satisfying ASTM C1028. In some embodiments, the friction coefficient may be at least 0.60. In some embodiments, the friction coefficient may be at least 0.80. In some embodiments, the plurality of texture elements 205 can be sprayed onto the top surface 203 of the mat substrate 202 as described in greater detail regarding FIG. 2D below. Accordingly, the texture layer 204 can be added to the top surface 203 of the mat substrate 202.

The acrylic material of the texture layer 204 can be similar to the acrylic material used in the mat substrate 202 as described above. In some embodiments, the texture layer 204 can include the acrylic cement and acrylic admix. For example, in some embodiments, the acrylic material may include the same acrylic cement and the same acrylic admix as the mat substrate 202. In other embodiments, alternative or additional materials can be used for one or the other of the texture layer and the mat substrate. The texture layer 204 can include more acrylic cement than acrylic admix. In some embodiments, the acrylic cement and acrylic admix can be included in a desired ratio. For example, the texture layer 204 can include a ratio of from 2:1 acrylic cement to acrylic admix to 5:1 acrylic cement to acrylic admix, or about 2:1 acrylic cement to acrylic admix to about 5:1 acrylic cement to acrylic admix, for example 2:1, 3:1, 4:1, or 5:1 acrylic cement to acrylic admix or about 2:1, about 3:1, about 4:1, or about 5:1 acrylic cement to acrylic admix. In some embodiments, the ratio can preferably be 3:1 or about 3:1 acrylic cement to acrylic admix.

The plurality of texture elements 205 can be formed of solid discrete portions of one or more materials. In some embodiments, the plurality of texture elements 205 can be sand, silica bits, or otherwise. For example, the plurality of texture elements can be 30 grit silica sand. In some embodiments, the plurality of texture elements 205 may not be sand (e.g., may be a material other than sand). In some embodiments, the plurality of texture elements 205 can be formed from the acrylic material. For example, the plurality of texture elements 205 can be discrete elements or nodules of the acrylic material applied to the top surface 203 of the mat substrate 202. The plurality of texture elements 205 can be uniformly or non-uniformly applied across the top surface 203 of the mat substrate 202. As described above, the plurality of texture elements 205 can be discrete nodules deposited about the top surface 203 of the mat substrate 202. Accordingly, each of the plurality of texture elements 205 may have a unique size. The size of the plurality of texture elements 205 can include a greater dimension in one direction. Each of the plurality of texture elements 205 can include a width extending along the direction of the top surface 203 and a thickness extending orthogonally to the direction of the top surface 203. In some embodiments, the plurality of texture elements 205 may have a greater width than thickness. For example, the plurality of texture elements 205 may flatten along the top surface 203 after being sprayed. In some embodiments, the plurality of texture elements 205 can each protrude from the top surface 203 ranging from 0.01 millimeter (mm) to 2 mm, or about 0.01 mm to about 2 mm, or 0.06 mm to 1.6 mm, or about 0.06 mm to about 1.6 mm. In some embodiments, the plurality of texture elements 205 may be formed in uniform sizes and shapes. In some embodiments, the plurality of texture elements 205 may be non-uniform. For example, the plurality of texture elements 205 can be rounded and/or include one or more edges. The one or more edges may be formed from splatter as the texture element mixture contacts the top surface 203 of the mat substrate 202. Accordingly, the plurality of texture elements 205 can create a variable non-uniform surface.

In some embodiments, the mat substrate 202, the texture layer 204, or both can include a colorant. In some embodiments, the colorant, when included, can be yellow, red, blue, black, dark gray, or light gray, or any other desired or suitable color. In some embodiments, a different colorant can be used. In some embodiments, no colorant may be used in one or both of the mat substrate 202 and the texture layer 204. In some embodiments, the colorant can be mixed in with the other ingredients of the mat substrate and/or texture layer.

Figure 2B:
FIG. 2B is a schematic diagram that illustrates various layers that can be present in a detectable warning system according to some embodiments.

FIG. 2B is a cross-section view of a textured detectable warning system 200 that illustrates various optional layers that can be present in the detectable warning system 200, in any combination with any other features, dimensions, materials, or other details of any other embodiments disclosed herein, according to some embodiments. As shown in FIG. 2B, some embodiments of the detectable warning system 200 can include the mat substrate 202, the texture layer 204 (which can include a plurality of texture elements across an upper surface of the mat substrate), a first top coat layer 206, a second top coat layer 208, and a UV protective layer 210, or any combination of the foregoing layers over the mat substrate. For example, the detectable warning system can include the mat substrate 202 and the texture layer 204 described above with additional layers. The mat substrate 202 can be dried, cured, and/or the like to form a solid mat substrate 202 prior to additional layers being applied.

The first top coat layer 206, second top coat layer 208, or both can be paint layers. For example, an exposed top surface of the texture layer 204 (and, if the mat substrate 202 is not completely coated by the texture layer 204, an exposed top surface of the mat substrate 202) can be painted with one or more top coat layers. In some embodiments, the one or more top coat layer(s) can be a latex based paint. For example, the one or more top coat layer(s) can include calcium carbonate, water, and an acrylic polymer. The top coat layer(s) can provide several benefits. For example, the top coat layer(s) can improve the appearance of the detectable warning system 200. In some embodiments, the top coat layer(s) can increase the lifespan of the detectable warning system. In some embodiments, the top coat layer(s) can contrast the visual appearance of the detectable warning system 200 from a surrounding structure (e.g., concrete or paved surface). In such embodiments, the top coat layer(s) may aid identifying a boundary between a pedestrian walkway and a road or other potential hazard. For example, the top coat layer(s) can be yellow, blue, green, and/or red. In some embodiments, top coat layer(s) may not be used. In some cases, a single top coat layer can be used (e.g., the detectable warning system 200 can have a single top coat layer). In some cases, multiple top coat layers can be used. For example, there can be zero, one, two, three, four, or more top coat layers.

In some embodiments, the UV protective layer 210 can provide protection against ultraviolet light, thereby eliminating or reducing damage or degradation of the mat substrate 202, texture layer 204, first top coat layer 206, and/or second top coat layer 208 that can result from exposure to ultraviolet light. In some embodiments, the UV protective layer 210 can include a polyurethane coating. In some embodiments, the UV protective layer 210, second top coat layer 208, and/or first top coat layer 206 can provide protection against chemicals, cleaning agents, and so forth that could otherwise damage the mat substrate 202, texture layer 204, or both. Accordingly, the UV protective layer 210 may prevent the fading of the color(s) of the top coat layer(s). This may advantageously extend the utility life of the detectable warning system 200 by maintaining the visual distinction of the detectable warning system 200. In some embodiments, the UV protective layer 210, second top coat layer 208, and/or first top coat layer 206 can improve slip resistance of the detectable warning system 200.

In some embodiments, a sealant can be applied. The sealant can be the same as or different from the UV protective layer 210. In some embodiments, the sealant can be an acrylic sealer. In some embodiments, the sealant can be applied as a liquid, for example poured and/or rolled onto the mat or mat substrate. In some embodiments, the sealant can be a topmost layer of a detectable warning system. In some embodiments, the sealant can be applied during a manufacturing process of the detectable warning system (e.g., in the factory during production). In some embodiments, the sealant can be applied at an installation site, for example after the detectable warning system is unrolled (if shipped in a rolled state), after the detectable warning system is placed in an installation position, and so forth.

Figure 2C:
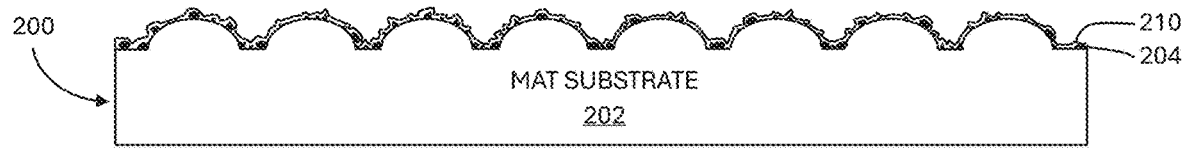
FIG. 2C is a schematic diagram that illustrates various layers that can be present in a detectable warning system according to some other embodiments.
Figure 2E:
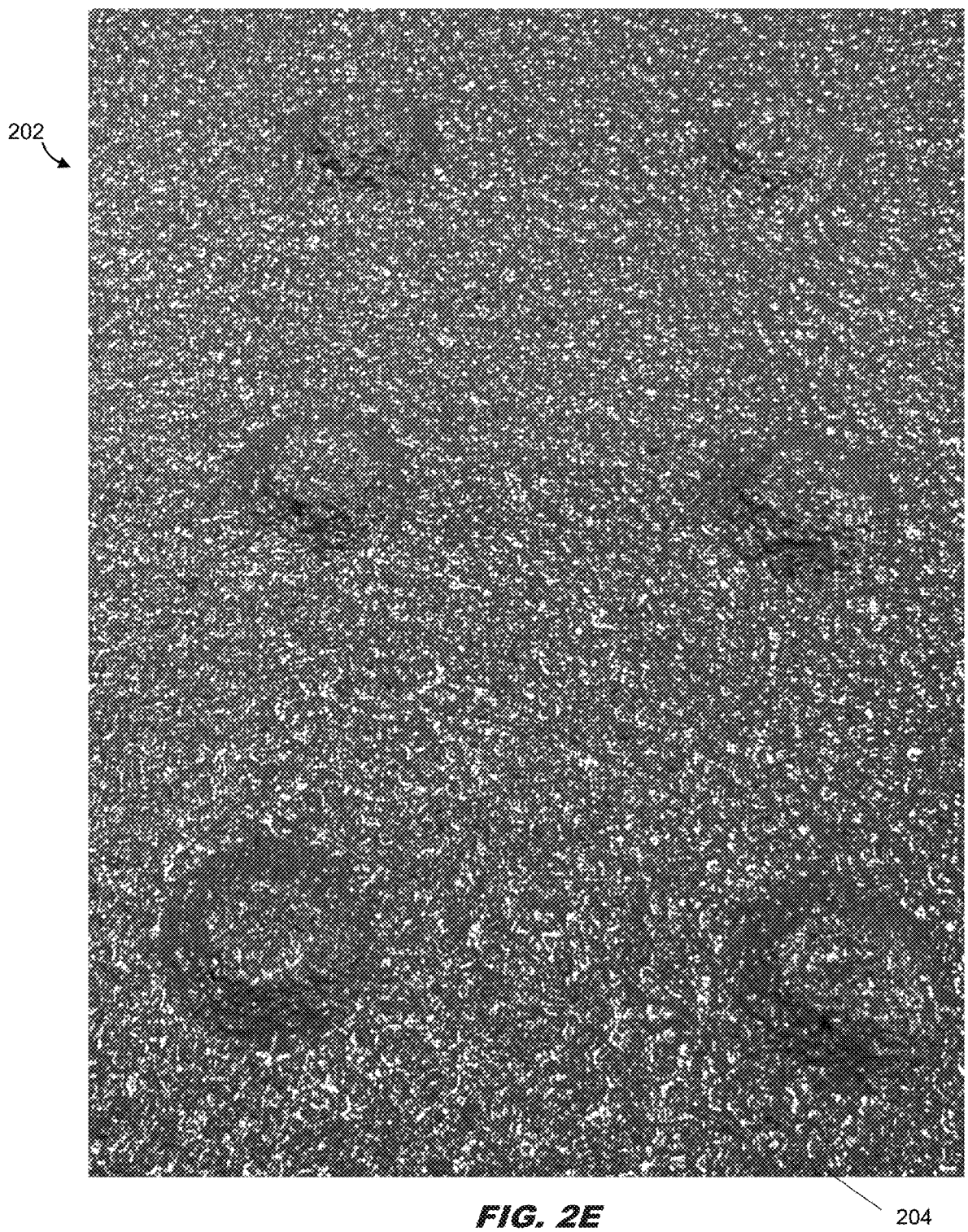
FIGS. 2E-2H are photographs of a detectable warning system according to some embodiments.
Figure 2F:
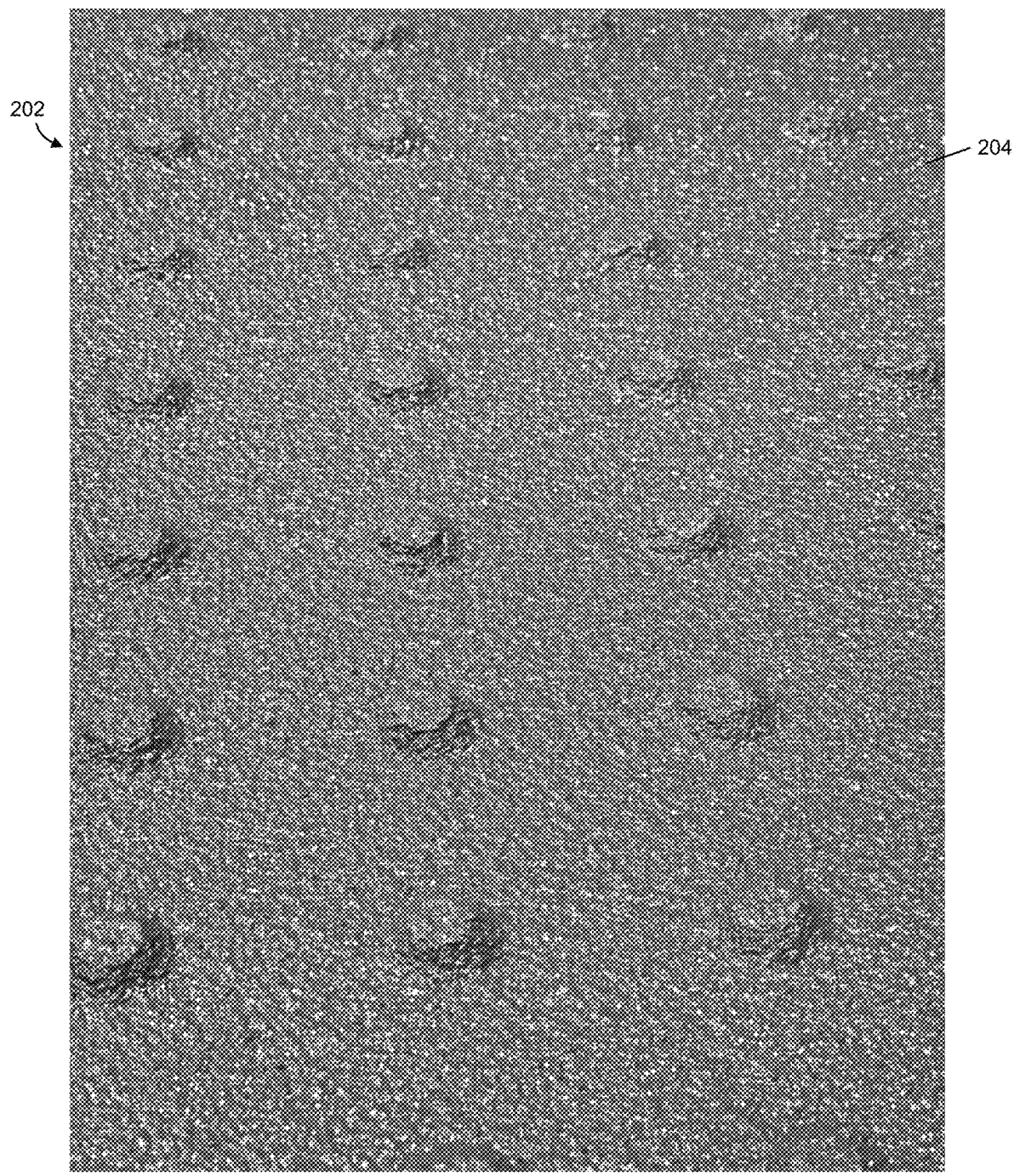
Figure 2G:
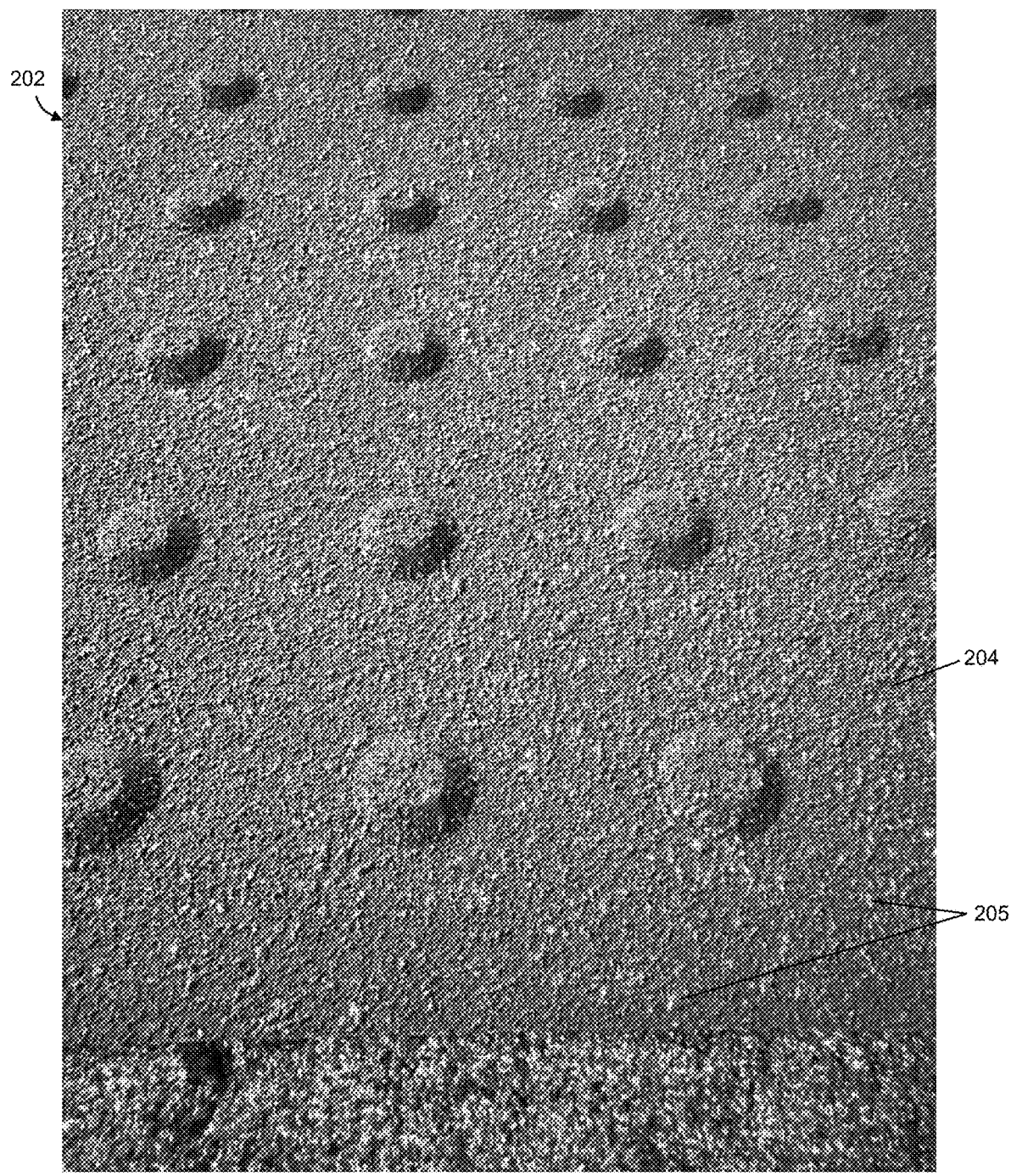
Figure 2H:
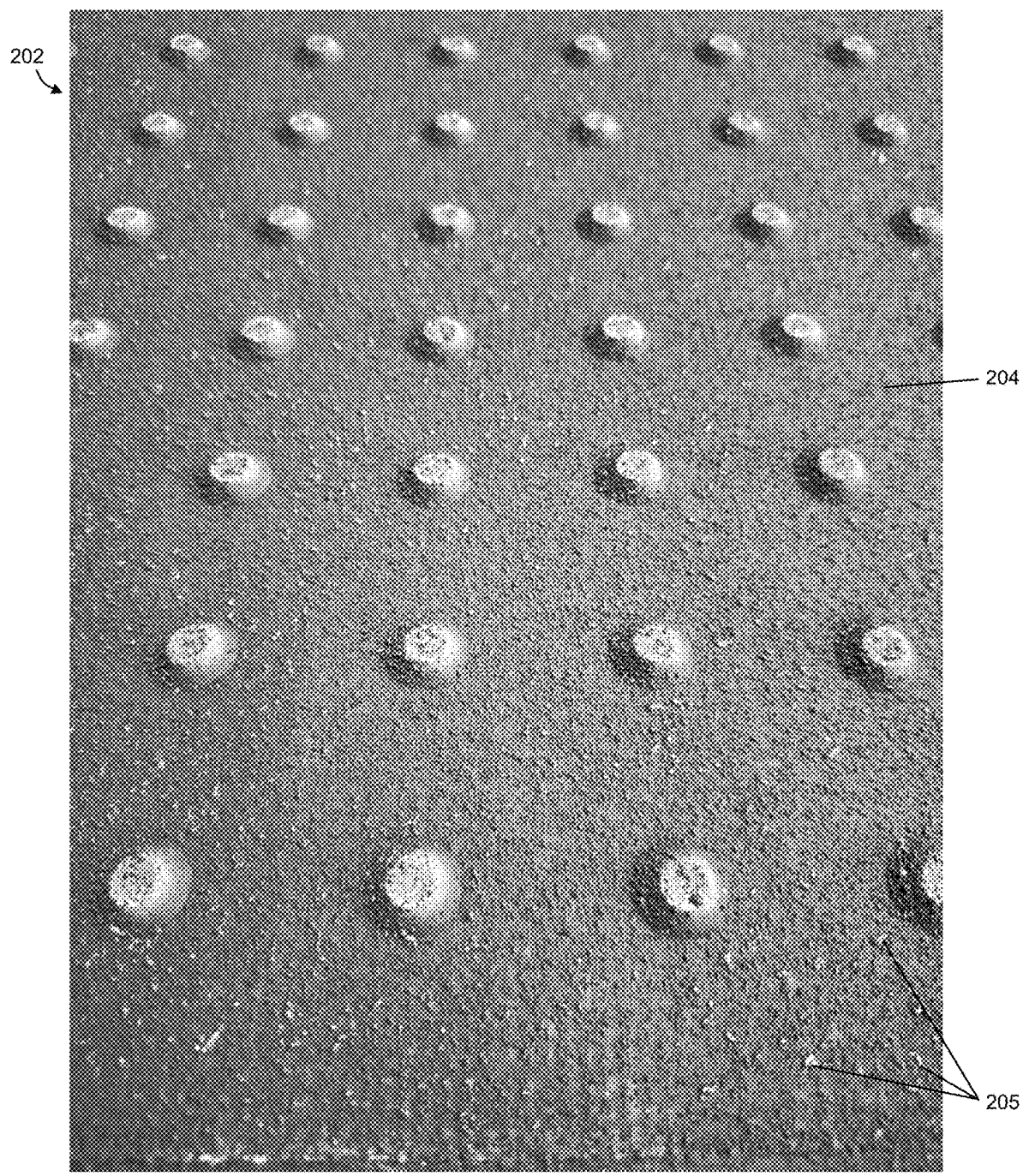
Figure 21:
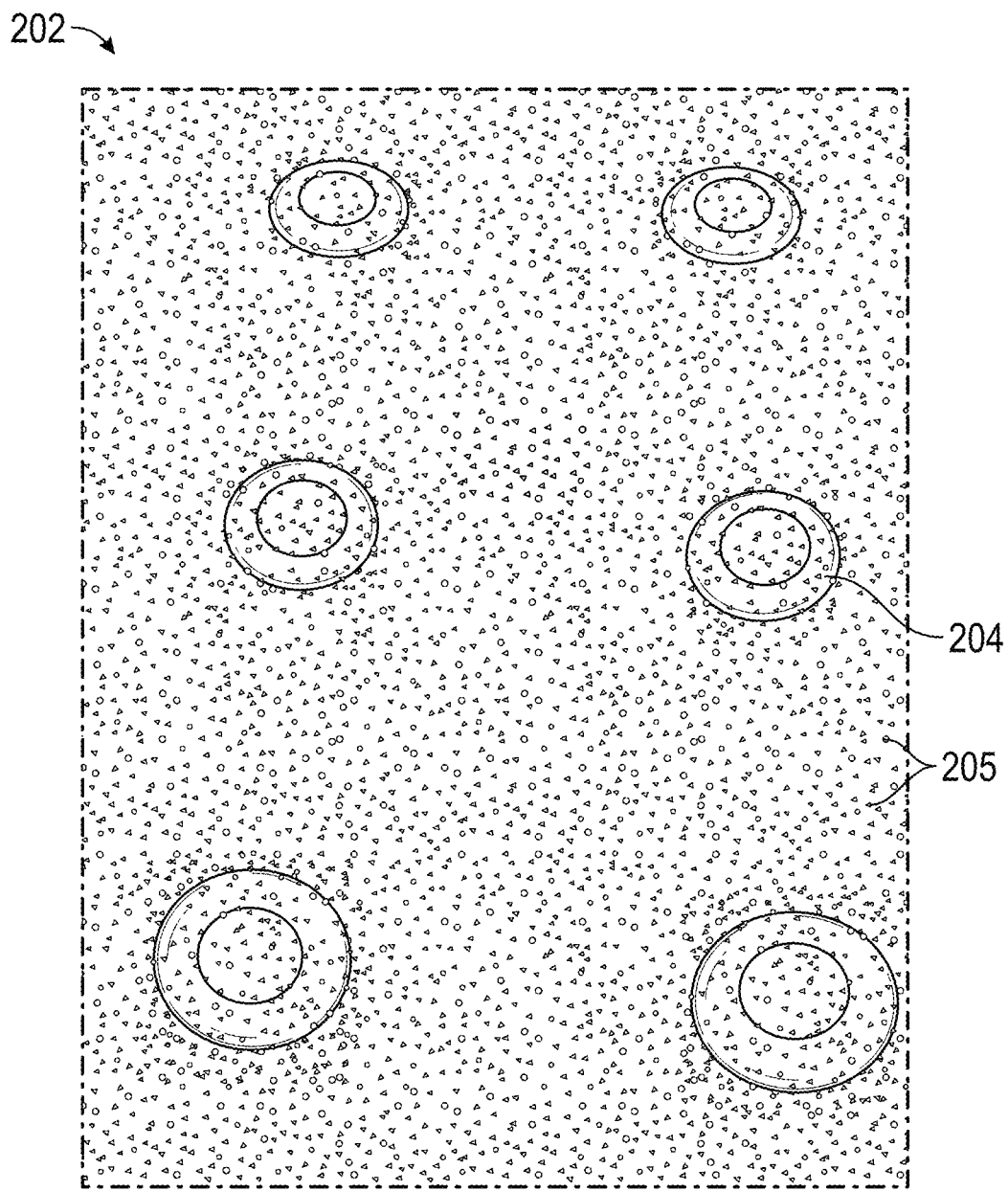
Figure 2J:
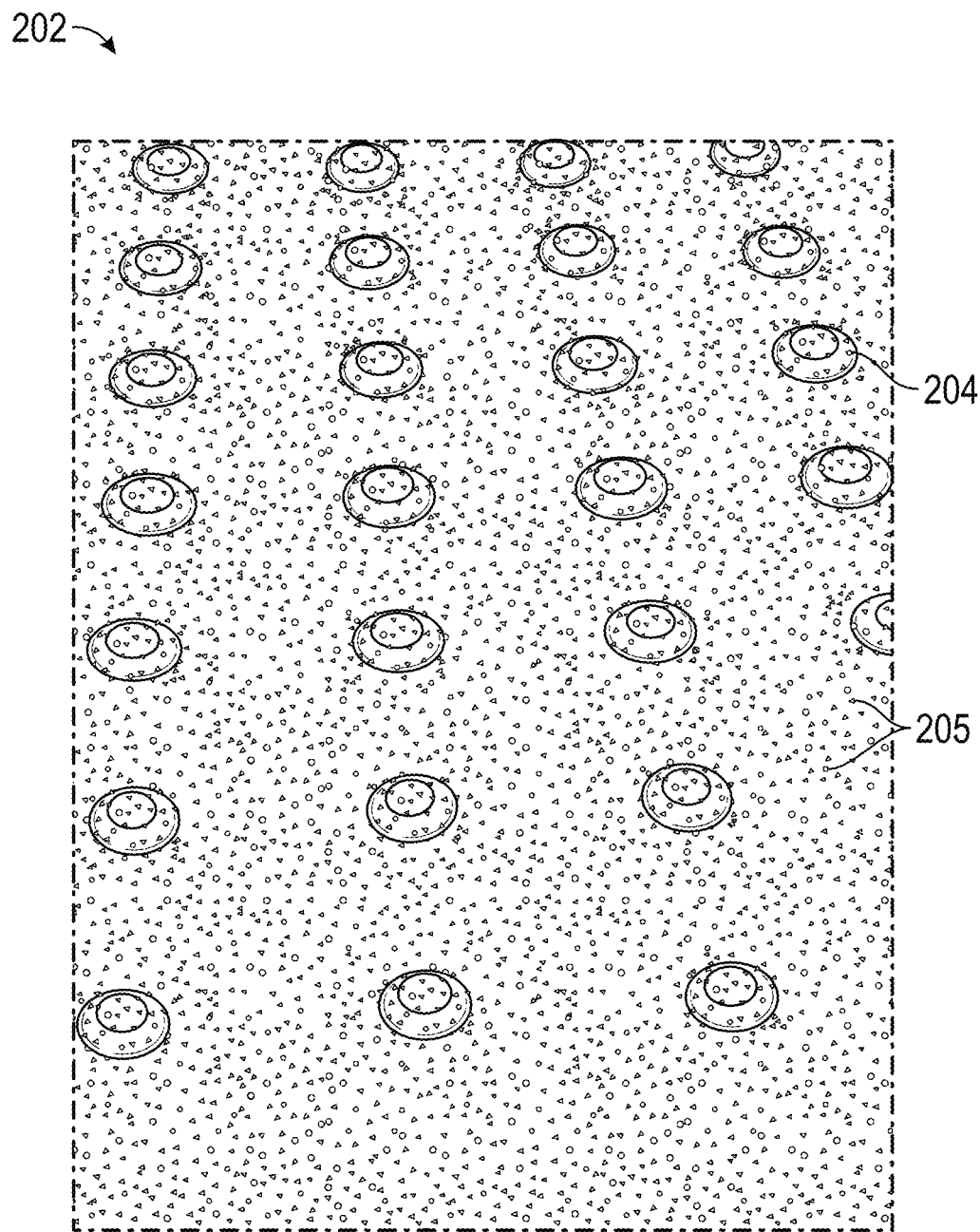
Figure 2K:
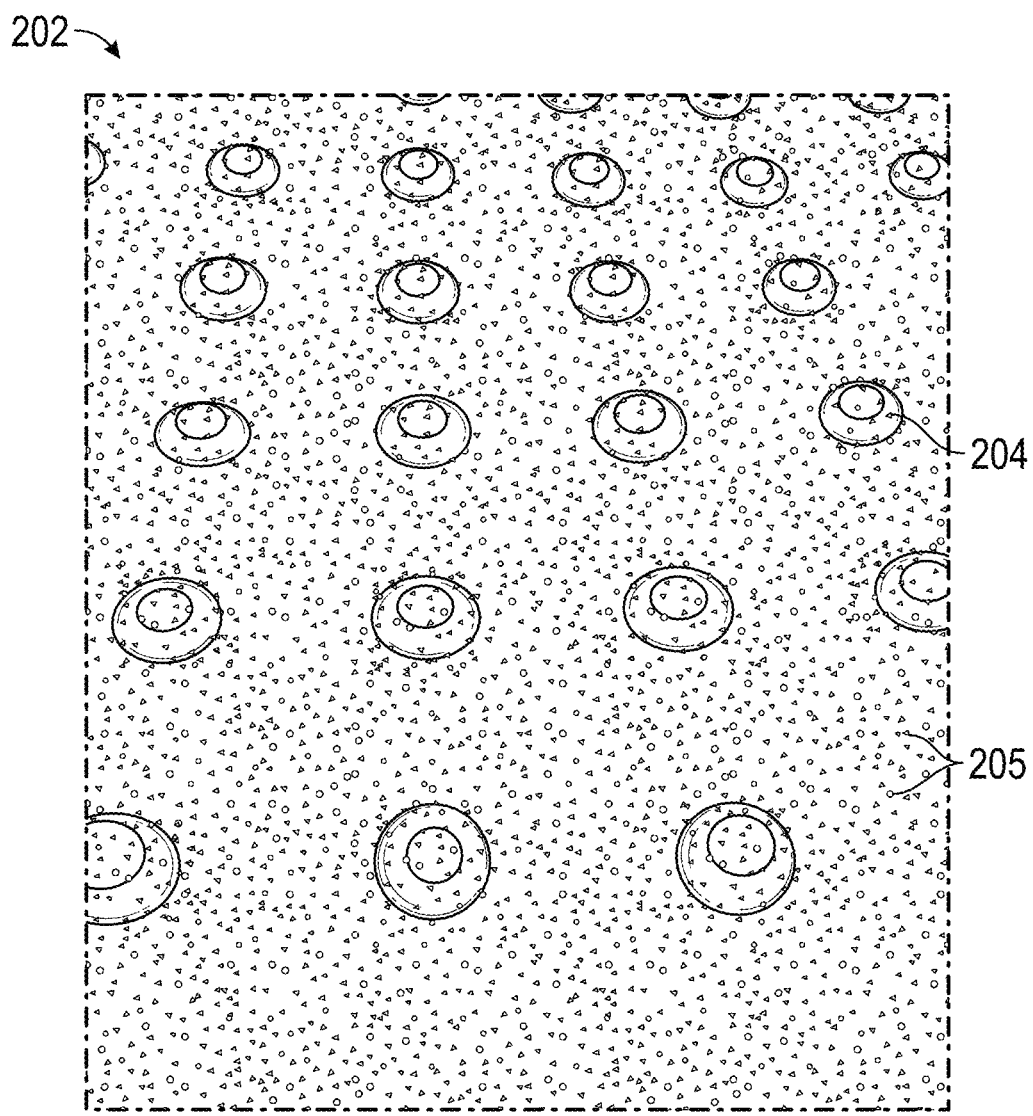
Figure 2L:
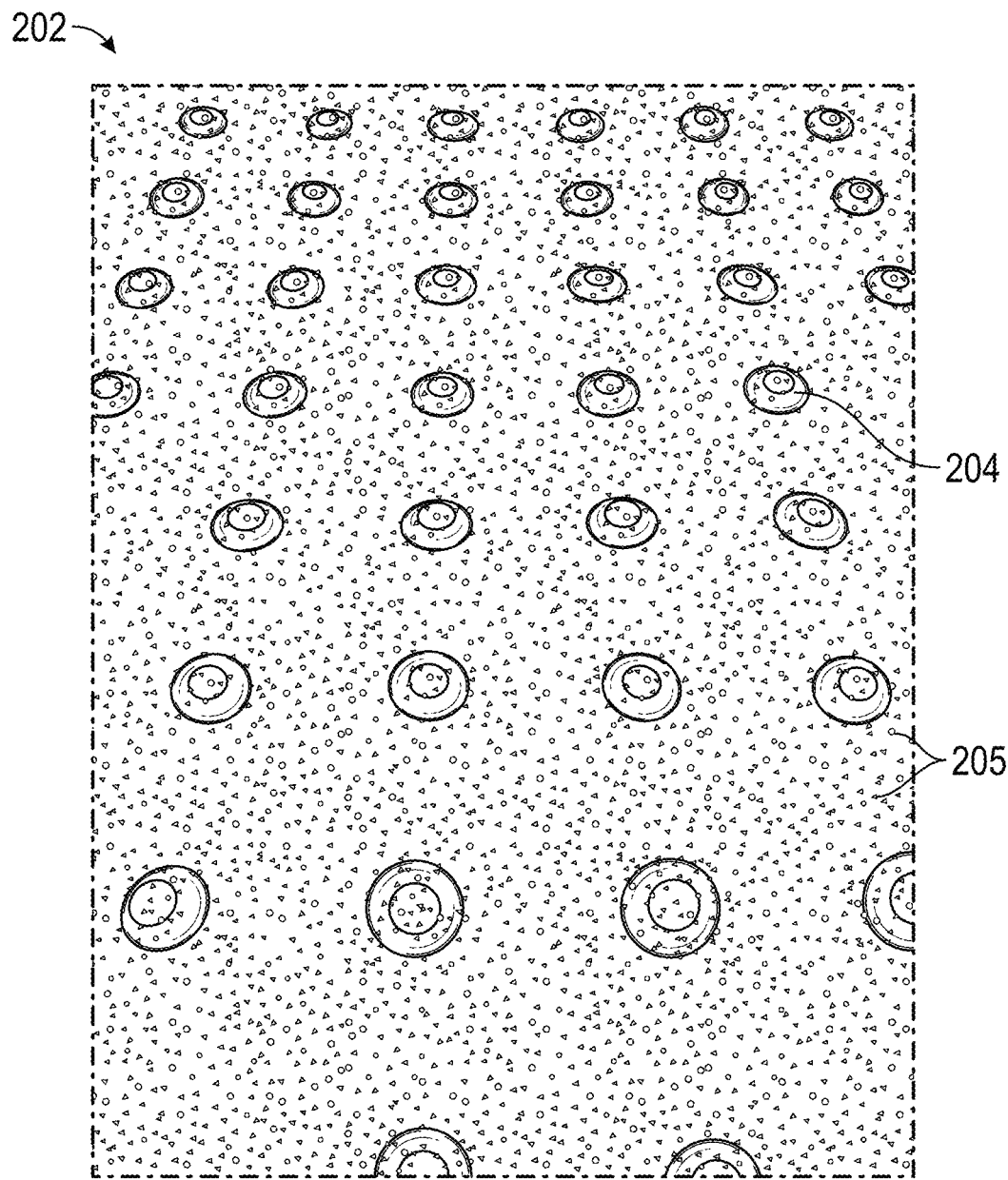

FIG. 2C is a cross-section view of another detectable warning system according to some embodiments. The detectable warning system of FIG. 2C can have advantages and disadvantages as compared with the detectable warning system of FIG. 2B. For example, the embodiment of the detectable warning system 200 shown in FIG. 2C can include fewer layers, thereby requiring less labor, effort, and cost to manufacture. As shown, the embodiment of the detectable warning system 200 shown in FIG. 2C can include the mat substrate 202, the texture layer 204, and the UV protective layer 210. Some embodiments of the detectable warning system 200 shown in FIG. 2C can be made without a first top coat layer 206 and/or without a second top coat layer 208. The detectable warning system of FIG. 2C can be simpler and cheaper to manufacture, but may be less aesthetically pleasing than the detectable warning system of FIG. 2B.

The acrylic materials of the mat substrate 202, the texture layer 204, and the one or more top coat layers as described above can be bonded together. For example, acrylic bonding allows the boundaries of each layer of the detectable warning system to mix and bond together. Accordingly, the detectable warning system may have enhanced bonding over prior art systems using adhesives.

FIG. 2D is a cross-section view of a mat substrate 202 being sprayed with a texture element mixture 212. As described above, the plurality of texture elements 205 may be discrete nodules. In some embodiments, the plurality of texture elements 205 may be formed by spraying a texture element mixture 212 onto the top surface 203 of the mat substrate 202. The spray pattern may position the plurality of texture elements 205 across the top surface 203 of the mat substrate 202. In some embodiments, the texture element mixture 212 may be sprayed from a sprayer 214. For example, the texture element mixture 212 may be sprayed from a hopper. In some embodiments, the spray pattern of the texture element mixture 212 from the sprayer 214 may follow a conical shape. The nodules of the texture element mixture landing on the top surface 203 of the mat substrate 202 may cure forming the plurality of texture elements 205. Accordingly, the plurality of texture elements 205 can be directly bonded with the top surface 203 of the mat substrate 202. In some embodiments, the plurality of texture elements 205 may be formed in uniform sizes and shapes. In some embodiments, the plurality of texture elements 205 may be non-uniform. For example, the plurality of texture elements 205 can be rounded and/or include one or more edges. The one or more edges may be formed from splatter as the texture element mixture contacts the top surface 203 of the mat substrate 202. Accordingly, the plurality of texture elements 205 can create a variable non-uniform surface.

FIGS. 2E-2H are photos of a mat substrate 202 after being sprayed with a texture element mixture 212. As shown in FIGS. 2E-2H, the plurality of texture elements 205 can protrude from the top surface of the mat substrate 202. Additionally, the plurality of texture elements 205 can cover the surface area of the top surface 203. The plurality of texture elements 205 can also be smaller than the plurality of raised features or protrusions.

FIGS. 2I-2L are illustrations of a mat substrate 202 after being sprayed with a texture element mixture. FIGS. 2I-2L are line drawings of FIGS. 2E-2H, respectively. For example, FIG. 2I corresponds to FIG. 2E, FIG. 2J corresponds to FIG. 2F, FIG. 2K corresponds to FIG. 2G, and FIG. 2L corresponds to FIG. 2H.

Figure 3A:
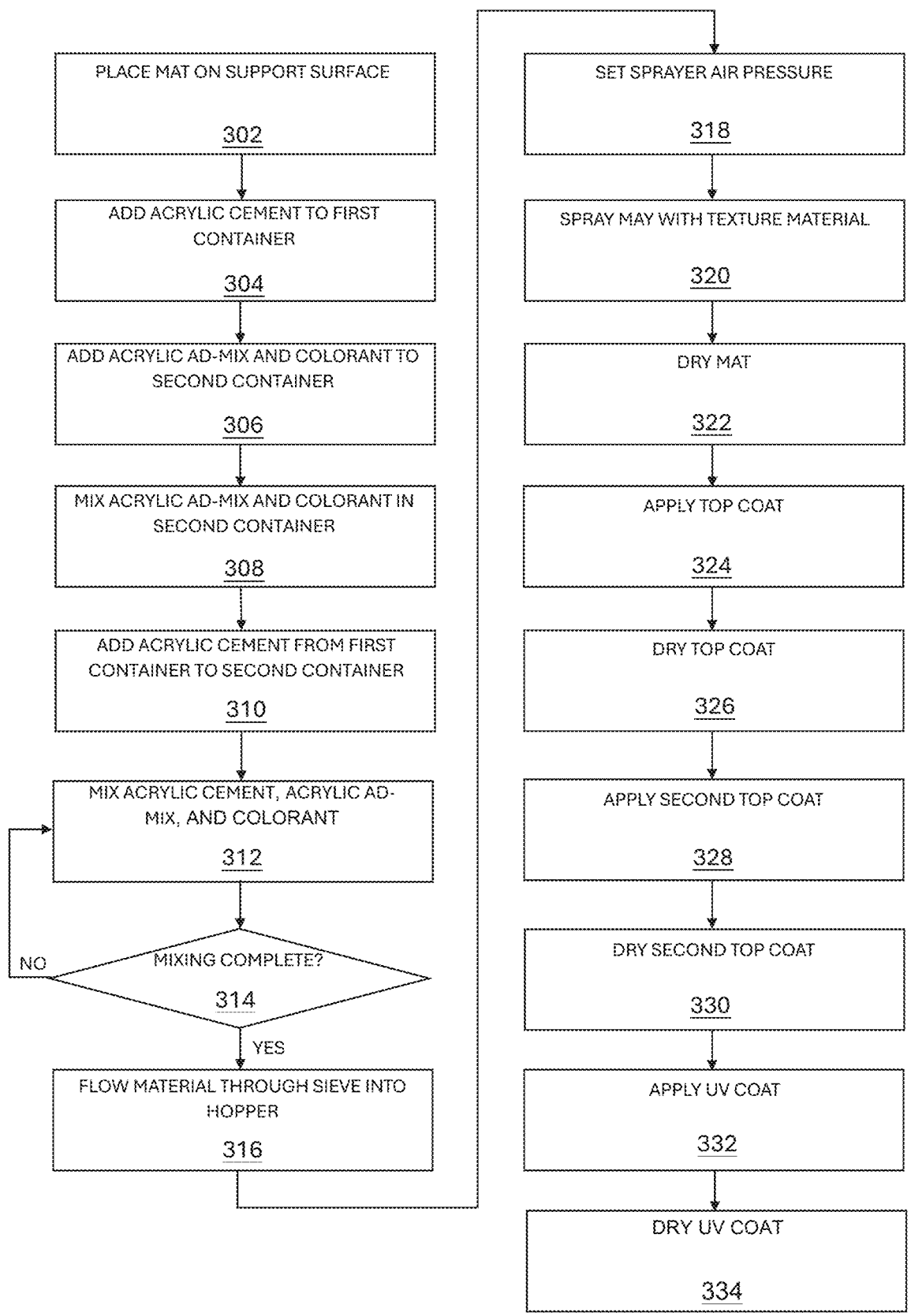
FIG. 3A is a flowchart that illustrates an example process for making a detectable warning system according to some embodiments.

FIG. 3A is an example flowchart that illustrates an example process for making a detectable warning system according to some embodiments.

At block 302, a mat substrate can be placed on a support surface where the mat substrate can be further processed to include additional layers of material (e.g., color layers, texture layers, sealing layers, etc.), as described. The support surface can be a surface configured to support the mat substrate during the fabrication of an installation ready detectable warning system. In some embodiments, a support surface can be an accessible support surface within a fabrication facility. For example, the support surface may be a worktop or table. A fabrication facility can be a facility located away from an installation site and configured to produce a detectable warning system. In some embodiments, a fabrication facility can be a factory configured to manufacture and produce installation ready detectable warning systems. The mat substrate can be the mat substrate 202 described above or below. In some embodiments, the mat substrate may be an acrylic mat. For example, the mat substrate can be formed of an acrylic material including an acrylic cement and acrylic admix. The mat substrate can have any of the features, components, materials, shapes, and/or other details of any of the embodiments of the mat substrate 202 described above, in addition to any of the features, components, materials, shapes, and/or other details described below. For example, the top surface of the mat substrate can include a plurality of raised features or protrusions, which can be domes, truncated domes, or have any other desired shape as described in any other embodiments disclosed herein, for example and without limitation. In some embodiments, the support surface may be a flat surface. The mat substrate may be further processed prior to receiving the plurality of texture elements and/or one or more top coat layers. For example, in some embodiments, the edges of the mat substrate may be cleaned. For example, a hand scraper may be used to clean edges and remove excess material. In some embodiments, the mat substrate may be cleaned of debris. For example, brushes and/or a blower may be used to remove debris and/or dust from the top surface of the mat substrate. The support surface may be prepared to receive the mat substrate prior to placing the mat substrate on the support surface. In some embodiments, debris may be removed from the support surface. For example, left over debris from a previously fabricated detectable warning system may be removed from the support surface.

A texture material can be prepared for application to the top surface of the mat substrate. A process for preparing the texture material is described with respect to block 304 through block 316, described below.

At block 304, a first amount of acrylic cement can be added to a first container, which can be any container suitable for mixing the materials. In some embodiments, the first container can be an open top container. For example, the first container may be a bucket. In some embodiments, the first container can be a weight bucket configured to measure the weight of the contents added to the first container. The acrylic cement can be the same or similar to the acrylic cement described above. For example, the acrylic cement may be a limestone and crystalline silica powder configured to solidify after being moistened. The acrylic cement may be added to the first container in quantities relative to an acrylic admix. In some embodiments, the first amount of acrylic cement added to the first container may be greater than a second amount of acrylic admix added to a second container. For example, the first amount of acrylic cement may be two to five times the second amount of acrylic admix. In some embodiments, the acrylic cement may be added in quantities of about 12 pounds per mat substrate.

At block 306, a second amount of acrylic admix can be added to a second container. In some embodiments, one or more colorants can be added to the second container. In some embodiments, the second container can be an open top container. For example, the second container may be a bucket. In some embodiments, the second container can be a weight bucket configured to measure the weight of the contents added to the second container. The acrylic admix can be the same or similar to the acrylic admix described above. For example, the acrylic admix may be an acrylic emulsion configured to be added as a bonding agent to bond cement. The acrylic admix may be added to the second container in quantities relative to the acrylic cement. In some embodiments, the second amount of acrylic admix added to the second container may be less than the first amount of acrylic cement added to the first container. For example, one part acrylic admix may be added to the second container. In some embodiments, the acrylic cement may be added in quantities of about 3 pounds per mat substrate. In some embodiments, water may be added. Water can be used to adjust the viscosity of the acrylic admix. For example, water can be added to thin the acrylic admix and reduce the viscosity. The one or more colorants can be a color additive. The one or more colorants can be configured to change the color of a material or a surface. In some embodiments, the one or more colorants can be a dye, a pigment, or other material configured to change a color. For example, the one or more colorants can be an acrylic colorant. In some embodiments, the one or more colorants may be added in quantities of about 0.13 cups per mat substrate.

At block 308, the contents of the second container can be mixed together. For example, a spindle may be placed within the second container to mix the acrylic admix and the one or more colorants (if colorant is added). The mixing may evenly distribute the one or more colorants within the acrylic admix. Mixing the acrylic admix with the one or more colorants can result in a colored acrylic admix.

At block 310, the acrylic cement from the first container can be added to the second container. The combination of the acrylic cement and the acrylic admix can form a texture element mixture. In some embodiments, the acrylic cement from the first container can be added to the second container while the contents of the second container are mixed together. As described above, the first container may contain a first amount of acrylic cement and the second container may contain a second amount of acrylic admix. The first amount and the second amount can be provided in a desired ratio, for example of from 2:1 acrylic cement to acrylic admix to 5:1 acrylic cement to acrylic admix, or about 2:1 acrylic cement to acrylic admix to about 5:1 acrylic cement to acrylic admix, for example 2:1, 3:1, 4:1, or 5:1 acrylic cement to acrylic admix or about 2:1, about 3:1, about 4:1, or about 5:1 acrylic cement to acrylic admix. In some embodiments, the ratio can preferably be 3:1 or about 3:1 acrylic cement to acrylic admix. In some embodiments, water can be added to reduce the viscosity of the texture element mixture. For example, a thinner texture element mixture can flow easier during a spray or splatter step, can aid in achieving a more uniform and/or more desirable thickness (e.g., a smaller thickness), and so forth.

At block 312, the contents of the second container can be mixed together. In some embodiments, the acrylic cement and acrylic admix can be mixed together in the second container. In some embodiments, the spindle may continue to spin from block 308 without interruption. Mixing the acrylic cement with the colored admix can result in a hard, durable surface that can be resistant to most chemicals, acids, water, and weather when cured. The resulting material can also be colored according to the one or more colorants.

At decision point 314, if mixing is complete, the process can continue. Mixing can be complete if the texture element mixture of the acrylic cement and admix is homogeneous. For example, the mixing can be complete where the acrylic cement and colored admix is evenly disturbed such that the resulting texture element mixture is uniform without irregularities. In some embodiments, mixing can be complete when the ingredients are evenly distributed through the texture element mixture. If not, mixing can continue. In some embodiments, the acrylic cement, acrylic admix, and the one or more colorants (if a colorant is used) can be mixed for a period of from about 1 minute to about 5 minutes, for example 1 minute to 5 minutes, for example 2.5 minutes. It will be appreciated that the mixing time can vary, for example depending upon the mixing speed, type of instrument used for mixing (for example, a large paddle, a beater, and so forth), and so forth.

At block 316, the texture element mixture of the acrylic cement, acrylic admix, the one of more colorants (if colorants are used) can optionally be filtered through a sieve to remove any solid matter that is too large. For example, in some embodiments, the texture material can have a nominal particle size of from 0.01 millimeters (mm) to 2 mm, or about 0.01 mm to about 2 mm, or 0.06 mm to 1.6 mm, or about 0.06 mm to about 1.6 mm. Accordingly, solid matter that is larger than 2 mm may be removed through the sieve. After flowing through the sieve, the texture element mixture can be placed into a hopper of a sprayer.

At block 318, the air pressure of the sprayer can be set. The air pressure can be from 40 psi to 120 psi, or about 40 psi to about 120 psi, for example 40 psi to 120 psi, or about 40 psi to about 120 psi, for example 80 psi or about 80 psi.

At block 320, the mat substrate can be sprayed with the texture element mixture (also referred to herein as the texture material). The texture element mixture can be sprayed at a distance of from about 6 inches to about 48 inches, for example 6 inches to 48 inches, for example 36 inches or about 36 inches. In some embodiments, the texture element mixture can be sprayed on the mat substrate in a circular motion. In some embodiments, the circular motion can have a radius of from about 3 inches to about 6 inches, for example 3 inches to 6 inches. In some embodiments, the circular motion can have a larger or smaller radius, for example less than three inches or greater than six inches. For example, the texture element mixture can be sprayed on the top surface of the mat substrate. The mat substrate can be sprayed at a distance of, for example, from about 1 foot to about 6 feet, for example 1 foot to 6 feet, for example 3 feet or about 3 feet. In some embodiments, the mat substrate may be sprayed with the texture element mixture in sections. For example, a first side of the mat substrate can be sprayed first. A center section of the mat substrate can be sprayed second. A second side of the mat substrate opposite the first side can be sprayed last. In some embodiments, the texture element mixture can be applied uniformly. In some embodiments, the texture element mixture can be applied non-uniformly. The resulting application of the texture element mixture can provide an irregular surface to the top surface of the mat substrate.

At block 322, the mat substrate and sprayed texture element mixture can be dried. Drying the mat substrate can cure the texture elements in place along or about the top surface of the mat substrate. Accordingly, the texture element mixture—the mixture of the acrylic admix and the acrylic cement—can form the plurality of texture elements when cured. In some embodiments, the plurality of texture elements can be in the form of a plurality of spaced apart nodules or globules of the texture element mixture about the upper surface of the mat substrate.

In some embodiments, the mat substrate may be moved from the support surface to a drying surface. For example, the mat substrate may be removed from a table and placed on a drying rack. The drying time can depend on a variety of factors, such as airflow, temperature, humidity, and so forth. In some embodiments, a drying process can last from 10 minutes to 60 minutes, or about 10 minutes to about 60 minutes, for example 20 minutes or about 20 minutes. Drying the texture element mixture on the top surface of the mat substrate may set a texture layer onto the top surface of the mat substrate. In some embodiments, the texture layer may provide a gripping surface for a detectable warning system. In some embodiments, an acrylic based texture material can bond with the acrylic based mat substrate thereby forming a single acrylic structure or at least forming a much stronger layered material where the interface strength from one layer to the next is increased. In some embodiments, the texture layer can be bonded to the mat substrate. Accordingly, the detectable warning system can have enhanced properties over adhering a plurality of texture elements to a substrate.

After drying, at block 324, a first top coat can be applied. In some embodiments, the first top coat can be applied on top of the dried texture material. In some embodiments, the first top coat can be a paint layer, as described above. For example, a paint layer can be sprayed onto the dried texture material. In some embodiments, the first top coat can be rolled onto the mat substrate above the texture material. For example, a first top coat may be applied via a roller. The first top coat can be applied uniformly across the top surface of the texture layer.

The first top coat can be dried at block 326. The drying time can depend on a variety of factors, such as airflow, temperature, humidity, and so forth. In some embodiments, a drying process can last from 10 minutes to 60 minutes, or about 10 minutes to about 60 minutes, for example 30 minutes or about 30 minutes.

After drying the first top coat, a second top coat can be applied at block 328. In some embodiments, the second top coat can be applied on top of the dried first top coat. In some embodiments, the second top coat can be another paint layer, as described above. For example, a paint layer can be sprayed onto the dried first top coat and/or rolled onto the first top coat. In some embodiments, the second top coat can be rolled onto the mat substrate above the first top coat. For example, a second top coat may be applied via a roller. The second top coat can be applied uniformly across the top surface of the first top coat.

At block 330, the second top coat can be dried. The drying time can depend on a variety of factors, such as airflow, temperature, humidity, and so forth. In some embodiments, a drying process can last from 10 minutes to 60 minutes, or about 10 minutes to about 60 minutes, for example 30 minutes or about 30 minutes.

After the second top coat is dried, a UV-protective coating can be applied at block 332. Though, some embodiments of the detectable warning system can be made without a UV-protective coating. In some embodiments, the UV-protective coating can be sprayed onto the second top coat or the first top coat. In some embodiments, the UV-protective material may be applied to the mat substrate via a roller. In some embodiments, the UV-protective material may be a sealant. The UV-protective coating can be applied uniformly across the top surface of the one or more top coats. In some embodiments, the UV-protective coating can be applied directly to the top surface of the texture layer.

After application of the optional UV-protective coating, the UV-protective coating can undergo a drying process at block 334. The drying time can depend on a variety of factors, such as airflow, temperature, humidity, and so forth. In some embodiments, a drying process can last from 10 minutes to 60 minutes, or about 10 minutes to about 60 minutes, for example 30 minutes or about 30 minutes.

It will be appreciated that the process depicted in FIG. 3A is merely an example process having a number of steps that can be considered optional and should not be interpreted in a limiting manner. In some embodiments, there can be more, fewer, and/or different steps. For example, in some embodiments, a colorant may not be used. In some embodiments, rather than placing the acrylic cement in a first container, the acrylic cement can be dispensed directly into the same container as the acrylic admix (and optionally, the one or more colorants). In some embodiments, the second container can be placed on a scale and acrylic cement can be added to the acrylic admix (and optionally, the one or more colorants) until a desired ratio of acrylic cement and acrylic admix is achieved.

In some embodiments, one or more of blocks (also referred to herein as steps) 324 through 334 can be omitted. For example, for some embodiments of a detectable warning system that are shipped to an installation site in a flat configuration, top coats, UV-protective coatings, and so forth may or may not be applied prior to shipment. For example, for some embodiments of a detectable warning system that are shipped in a rolled configuration, the top coats, UV-protective coatings, and so forth may or may not be applied prior to shipment. For some embodiments, rolling and/or unrolling of the detectable warning system may result in damage to the coatings. In such cases where some coatings are omitted from the detectable warning system as shipped, top coatings, UV-protective coatings, and so forth can be applied at the installation site.

In some embodiments, different paints, UV-protective coatings, and so forth can be applied depending on whether the detectable warning system is shipped in a flat, finished configuration or the paints and coatings are applied at the installation site. For example, more rigid coatings can be used when application is done at the installation site. In some embodiments, any of the coatings can be more flexible to allow the detectable warning system to be deformed to some degree (for example, to fit a curved walking surface) while maintaining the integrity of the coatings.

In some embodiments, after the detectable warning system is prepared (for example, according to the process depicted in FIG. 3A or another process), additional steps can be carried out. For example, the detectable warning system can be cut to a particular size, edges can be sanded to remove any burrs, and the finished detectable warning systems can be packaged for shipment to an installation site.

FIG. 3B is a flowchart that illustrates another example process for making a detectable warning system according to some embodiments. In some embodiments, the embodiment of the example process shown in FIG. 3B can have any of the steps, process, components, or other details or features of any other process embodiment disclosed herein. At block 302, a mat substrate (e.g., an acrylic mat) can be placed on a support surface. In some embodiments, the surface can be flat, curved, angled, or of any desired or suitable shape. The mat substrate can have any of the features, components, materials, shapes, and/or other details of any of the embodiments of the mat substrate described above, in addition to any of the features, components, materials, shapes, and/or other details described below. For example, the top surface of the mat substrate can include a plurality of raised features or protrusions, which can be domes, truncated domes, or have any other desired shape. At block 320, the mat can be sprayed with the texture element mixture (e.g., the texture material). At block 322, the mat and sprayed texture element mixture can be dried. After drying, at block 324, a first top coat can be applied. The first top coat can be dried at block 326. After drying, a second top coat can be applied at block 328. At block 330, the second top coat can be dried. After the second top coat is dried, a UV-protective coating can be applied at block 332. After application of the UV-protective coating, the UV-protective coating can undergo a drying process at block 334. This process may result in the detectable warning system shown in FIG. 2B.

FIG. 3C is a flowchart that illustrates another example process for making a detectable warning system according to some embodiments. In some embodiments, the embodiment of the example process shown in FIG. 3C can have any of the steps, process, components, or other details or features of any other process embodiment disclosed herein. At block 302, a mat substrate (e.g., an acrylic mat) can be placed on a support surface. In some embodiments, the surface can be flat, curved, angled, or of any desired or suitable shape. The mat substrate can have any of the features, components, materials, shapes, and/or other details of any of the embodiments of the mat substrate described above, in addition to any of the features, components, materials, shapes, and/or other details described below. For example, the top surface of the mat substrate can include a plurality of raised features or protrusions, which can be domes, truncated domes, or have any other desired shape. The mat substrate can be a mat substrate as described above. For example, the top surface of the mat substrate can include a plurality of raised features or protrusions, which can be domes, truncated domes, or protruding features having any other desired shape. At block 320, the mat substrate can be sprayed with the texture element mixture (e.g., the texture material). After drying the mat substrate and/or texture element mixture, one or more top coats may be applied to the mat substrate at block 336. The one or more top coats may include a UV-protective coating. This process may result in the detectable warning system shown in FIG. 2C.

FIG. 3D is a flowchart that illustrates another example process for making a detectable warning system according to some embodiments. FIG. 3D is similar to FIG. 3C with the addition of cutting the mat to size at block 338. In some embodiments, the embodiment of the example process shown in FIG. 3D can have any of the steps, process, components, or other details or features of any other process embodiment disclosed herein. At block 302, a mat substrate (e.g., an acrylic mat) can be placed on a support surface. In some embodiments, the surface can be flat, curved, angled, or of any desired or suitable shape. The mat substrate can have any of the features, components, materials, shapes, and/or other details of any of the embodiments of the mat substrate described above, in addition to any of the features, components, materials, shapes, and/or other details described below. For example, the top surface of the mat substrate can include a plurality of raised features or protrusions, which can be domes, truncated domes, or have any other desired shape. In some embodiments, the mat substrate may be prefabricated into a detectable warning system and may be prepared for installation within a cement slab and/or on a paved surface. For example, the detectable warning system may be prepared for installation along a sidewalk, a transit station, or other boundary between a pedestrian walkway and a hazard. In some embodiments, the detectable warning system may be precut to predetermined dimensions. For example, a predetermined dimension may be about 3 feet by about 4 feet, for example 3 feet by 4 feet, about 3 feet by about 5 feet, for example 3 feet by 5 feet, about 2 feet by about 4 feet, for example 2 feet by 4 feet, about 2 feet by about 5 feet, for example 2 feet by 5 feet, about 2 feet by about 10 feet, for example 2 feet by 10 feet, about 3 feet by about 10 feet, for example 3 feet by 10 feet, or any other desired size or size that is suitable for an installation site. In some embodiments, the detectable warning system may be cut to match a boundary between a pedestrian walkway and a hazard at the installation site. For example, the detectable warning system may be cut according to a square, rectangular pattern, a triangular pattern, a rounded or curved pattern or shape, or any other desired shape. The detectable warning system may be removed from the drying rack and placed on a saw table. The detectable warning system can be cut with a saw. During the cutting process, one or more burrs may be created. Burrs may also be removed at block 338 to prepare the detectable warning system for use. In some embodiments, the edges of the detectable warning system may be deburred using a router, a sander, or other tool may be used to remove burrs and prepare the mat for commercial use.

Figure 3E:
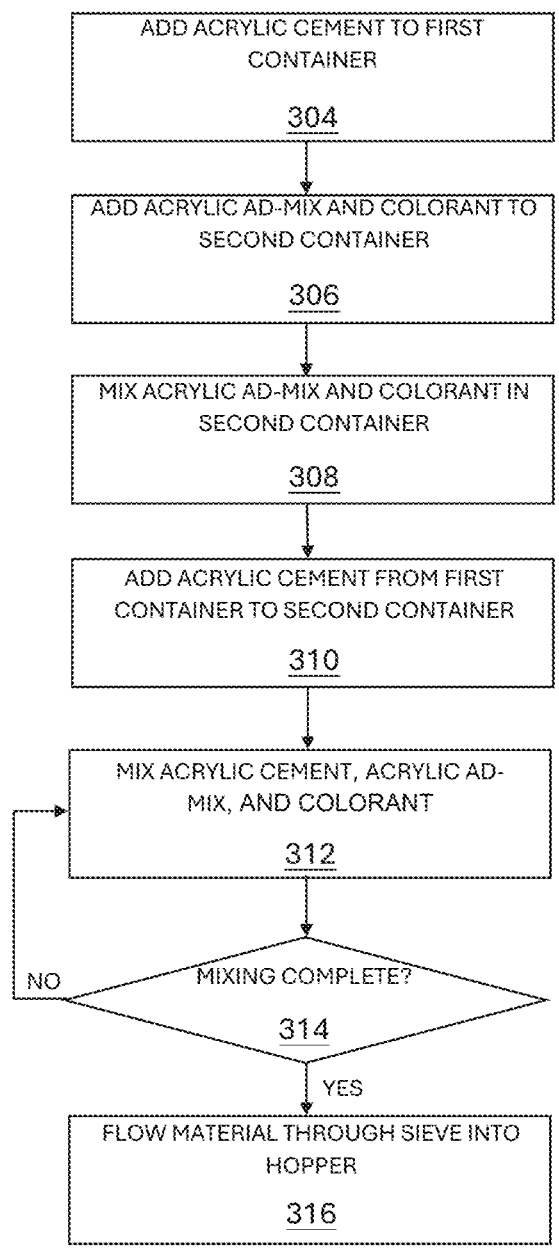
FIG. 3E is a flowchart that illustrates an example process for mixing a texture material.

FIG. 3E is a flow chart that illustrates an example process of making a texture material according to some embodiments. In some embodiments, the embodiment of the example process shown in FIG. 3E can have any of the steps, process, components, or other details or features of any other process embodiment disclosed herein. At block 304, an acrylic cement can be added to a first container. At block 306, an acrylic admix and one or more colorants (if colorants are used) can be added to a second container. In some embodiments, iron oxide can also be added to the second container. At block 308, the acrylic admix and the one or more colorants can be mixed together in the second container. In some embodiments, iron oxide may be mixed in the second container with the acrylic admix and colorant. At block 310, the acrylic cement from the first container can be added to the second container. The acrylic cement and acrylic admix can be provided in a desired ratio, as described above. At block 312, the acrylic cement, acrylic admix, and the one or more colorants can be mixed together in the second container. At decision point 314, if mixing is complete, the process can continue. If not, mixing can continue. At block 316, the texture element mixture of the acrylic cement, acrylic admix, and the one of more colorants (if colorants are used) can be filtered through a sieve to remove any solid matter that is too large. After flowing through the sieve, the texture element mixture can be placed into a hopper of a sprayer. The mixed texture material may then be applied to a mat substrate as described in FIG. 3B.

Figure 4:
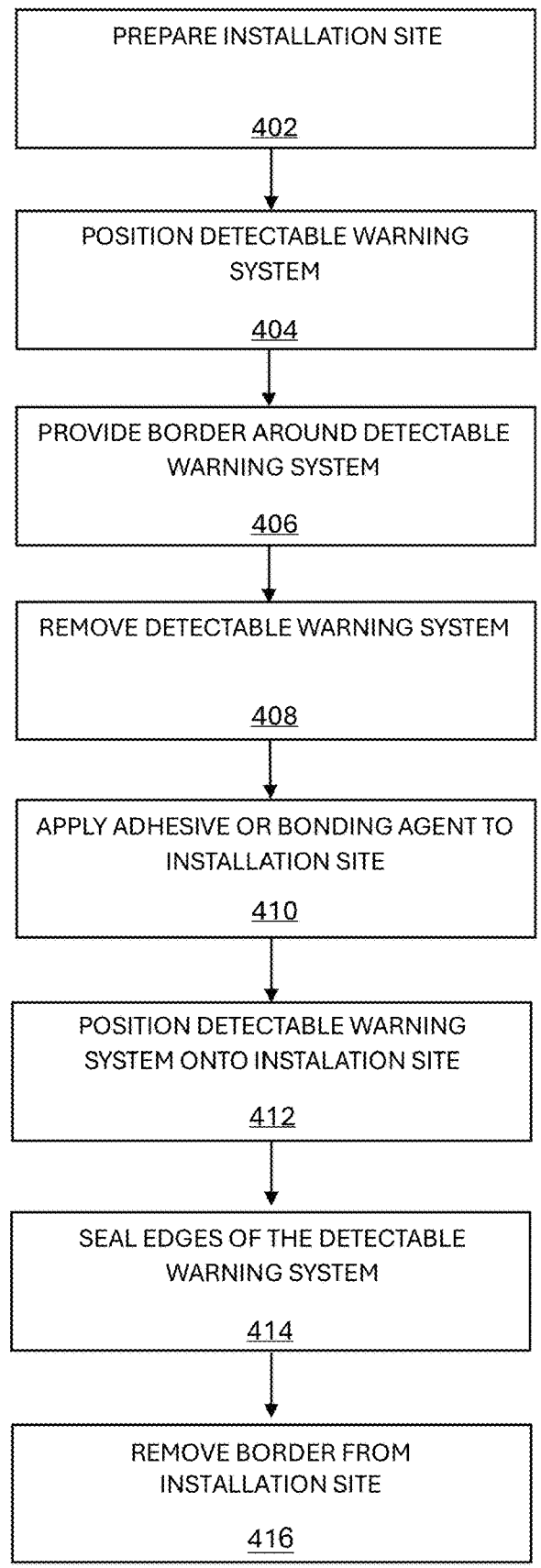
FIG. 4 is a flow chart that illustrates an example process for installing a prefabricated detectable warning system.

FIG. 4 is a flow chart that illustrates an example process of installing a prefabricated detectable warning system. A detectable warning system resulting from the processes described above may result in a prefabricated and ready to install detectable warning system without requiring additional manufacturing steps. The following method may be implemented to install the resulting detectable warning system.

At step 402, a surface of an installation site can be prepared. In some embodiments, a concrete slab or paved surface selected as an installation site may be cleaned of debris and dust. For example, the installation site may be cleaned with a broom, brush, and/or air blower to remove debris and dust. In some embodiments, the installation site may be further sanitized with chemical solvents.

At step 404, a detectable warning system can be positioned on the installation site and aligned. In some embodiments, the detectable warning system may be aligned between a pedestrian walkway and a hazard. For example, the detectable warning system may be placed between a sidewalk and a road, or a transit platform and transit rails.

At step 406, a border may be provided around the perimeter of the detectable warning system to mark the proper alignment. In some embodiments, tape may be placed on the installation site around the perimeter of the detectable warning system. The tape may mark the proper placement of the detectable warning system. Additionally, tape can prevent an adhesive or bonding agent from adhering to a concrete slab or paved surface beyond the perimeter of the detectable warning system.

At step 408, the detectable warning system may be removed. In some embodiments, the installation site can be further cleaned of any debris or dust after removing the detectable warning system.

At step 410, an adhesive or bonding agent may be applied to the installation site. In some embodiments, an adhesive or bonding agent may be rolled onto the concrete slab or paving surface. In some embodiments, an adhesive or bonding agent may be applied to a bottom surface of the detectable warning system.

At step 412, the detectable warning system can be placed onto the adhesive or bonding agent and aligned with the border. In some embodiments, pressure may be applied to the detectable warning system to compress the detectable warning system into the adhesive or bonding agent.

At step 414, the edges of the detectable warning system may be sealed. In some embodiments, an adhesive or bonding agent may be applied around the perimeter of the detectable bonding agent.

At step 416, the border may be removed. For example, the tape may be removed from the concrete slab or paved surface. In some embodiments, removing the border may remove any adhesive or bonding agent that may have been laterally displaced during the installation of the detectable warning system.

Accordingly, a prefabricated detectable warning system can be installed without applying multiple layers and/or waiting for multiple layers to dry thereby saving time. Additionally, texture elements do not need to be applied thereby eliminating the risk of inhaling particular matter and mitigating a risk of health to workers as they install the detectable warning system.

Figure 5A:
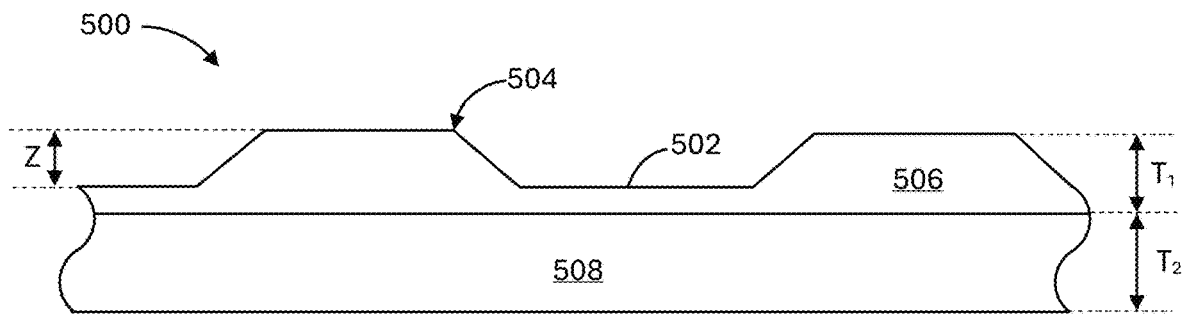
FIG. 5A is a side view of a mat substrate according to some embodiments.

FIG. 5A illustrates a side view of a mat substrate 500 according to some embodiments. The mat substrate 500 can be the same or similar to the mat substrate described above. For example, the mat substrate 500 can include a top surface 502 of the mat substrate 500 having a plurality of raised features or protrusions 504, which can be domes, truncated domes, or have any other desired shape. The mat substrate 500 is further shown to include multiple layers. In some embodiments, the mat substrate 500 can include a first layer 506 and a second layer 508.

In some embodiments, the first layer 506 can be formed of a first acrylic material. The first layer 506 can include acrylic cement, acrylic admix, and an oxide material. In some embodiments, the first layer 506 can further include a colorant. The oxide material can be aluminum oxide. The oxide material can strengthen the first layer 506. Accordingly, the first layer 506 may withstand repeated physical contact thereby extending the life of the mat substrate 500. The first layer 506 can include more acrylic cement than acrylic admix. In some embodiments, the ratio of acrylic cement to acrylic admix can be about 3:1. For example, the first layer 506 can include 7.5 pounds of acrylic cement and 2.25 pounds of acrylic admix. In some embodiments, the ratio of acrylic cement to oxide material can be about 5:1. For example, the first layer 506 can further include 1.5 pounds of oxide material.

In some embodiments, the second layer 508 can be formed of a second acrylic material. The second layer 508 can include acrylic cement, acrylic admix, and an acrylic adhesive. The acrylic adhesive can provide additional flexibility to the mat substrate 500. Accordingly, the mat substrate 500 can be rolled making shipping of the mat substrate 500 and resulting detectable warning system easier. The second layer 508 can include more acrylic cement than acrylic admix. In some embodiments, the ratio of acrylic cement to acrylic admix can be about 3:1. For example, the second layer 508 can include 7 pounds of acrylic cement and 2.5 pounds of acrylic admix. In some embodiments, the ratio of acrylic cement to acrylic adhesive can be about 7:1. For example, the second layer can further include 1 pound of acrylic adhesive.

As shown in FIG. 5A, the first layer 506 can include the plurality of raised features or protrusions 504. The second layer 508 can include a base layer below the plurality of raised features or protrusion 504. As further shown in FIG. 5A, the first layer 506 can have a first thickness T1 and the second layer 508 can have a second thickness T2. The first thickness T1 can be greater than the height Z of the plurality of raised features or protrusions 504. Accordingly, the first layer 506 can connect each of the plurality of raised features or protrusions 504 to a common first layer 506. In some embodiments, the second thickness T2 may be greater than the first thickness T1. Accordingly, the mat substrate 500 can be flexible because (1) the majority of the thickness of the mat substrate 500 includes the acrylic adhesive and (2) the first layer 506 is thin between each of the plurality of raised features or protrusions 504. A mat substrate 500 having two layers each implementing an oxide material or acrylic adhesive, respectively can increase the strength and durability of the plurality of raised features or protrusions 504 and flexibility of the mat substrate 500.

Figure 5B:
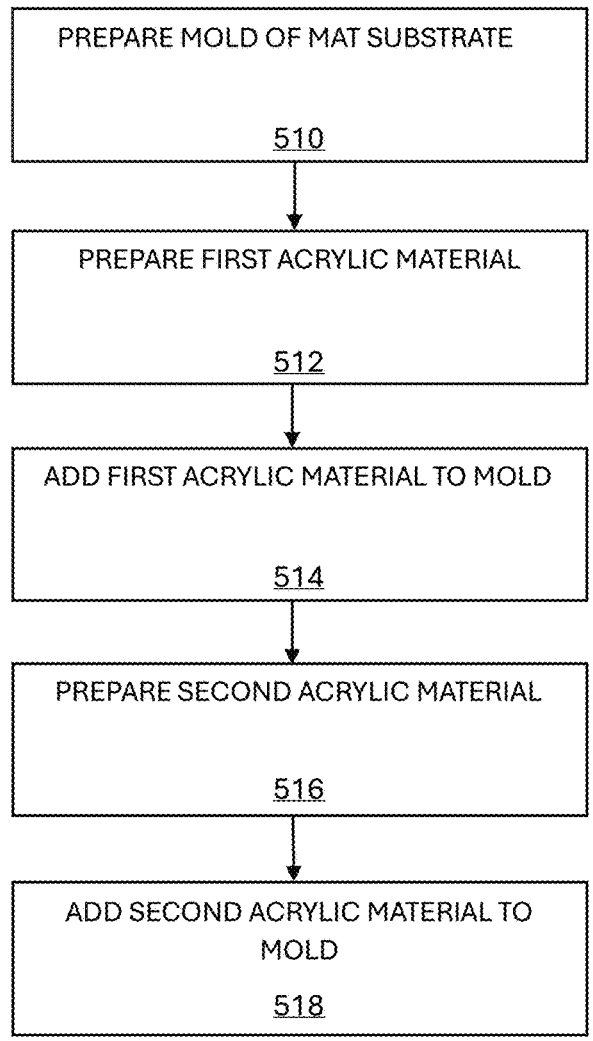
FIG. 5B is a flowchart that illustrates an example process for making the mat substrate of FIG. 5A.

FIG. 5B is a flowchart illustrating a method for forming a mat substrate as shown in FIG. 5A.

At block 510, a mold of the mat substrate is prepared. The mold may be a container configured to receive and shape a fluid material until the fluid material solidifies. The mold can thus shape and form a fluid material into a desired shape. The mold can include a bottom surface having a plurality of grooves or indents. The plurality of grooves or indents can be the inverse of the plurality of raised features or protrusions. The mold can further include one or more side edges extending upward from the bottom surface. The one or more side edges can form a boundary for a mat substrate. In some embodiments, the one or more side edges can be rectangular. The mold can be prepared by removing any excess material remaining after a previous use. In some embodiments, debris or dust can be removed to provide a clean working surface. In some embodiments, the interior surfaces of the mold can be sprayed. For example, a coating can be applied as a barrier between an acrylic material and the mold. This can help with removing the mat substrate after curing.

At block 512, a first acrylic material is prepared. The first acrylic material can include an acrylic cement, an acrylic admix, and an oxide material. In some embodiments, the first acrylic material can further include a colorant. Preparing the first acrylic material can include mixing the acrylic cement, acrylic admix, and the oxide material. In some embodiments, preparing the first acrylic material can include verifying that all of the materials are present. The method for preparing the first acrylic material is further described in FIG. 5C.

At block 514, the first acrylic material is added to the mold. The first acrylic material can be poured into each of the plurality of raised features or protrusions. In some embodiments, the first acrylic material can be added to the mold in excess of the volume of the plurality of raised features or protrusions. The excess first acrylic material can fill upward in the mold creating a first thickness. The first thickness can connect each of the plurality of raised features into a single layer of first acrylic material. In some embodiments, the first thickness can be evenly distributed across the mold.

At block 516, the second acrylic material is prepared. The second acrylic material can include an acrylic cement, an acrylic admix, and an acrylic adhesive. Preparing the second acrylic material can include mixing the acrylic cement, the acrylic admix, and the acrylic adhesive. The method for preparing the second acrylic material is further described in FIG. 5D.

At block 518, the second acrylic material is added to the mold. The second acrylic material can be poured on top of the first acrylic material. In some embodiments, the first acrylic material can be cured before the second acrylic material is added. The second acrylic material can fill upward in the mold creating a second thickness. The second thickness can form a base portion of the mat substrate. In some embodiments, the second thickness can be evenly distributed across the mold. In some embodiments, a mesh may be run over the first acrylic material prior to adding the second acrylic material into the mold.

After the first and second acrylic materials cure, the mat substrate can be removed from the mold. In some embodiments, the mold can be flipped such that an open end of the mold faces downward. For example, the mold can be turned over and the mold may be removed.

FIG. 5C is a flowchart illustrating a method for preparing the first acrylic material to be poured into the mold.

At block 520, an acrylic admix can be added to a first container. The acrylic admix can be the same as the acrylic admix described above. For example, the acrylic admix can be an acrylic emulsion configured to be added as a bonding agent to bond cement. The acrylic admix can be added to the first container according to a proper amount. In some embodiments, the proper amount can be about 2.25 pounds of acrylic admix for every 10 feet of length of a mat substrate.

At block 522, a colorant can be added to the first container. The colorant can be the same as the colorant described above. For example, the colorant can be a color additive configured to change the color of a material or a surface. In some embodiments, the colorant can be sifted. Sifting the colorant may avoid clumping and allow for proper separation of the colorant. The colorant can be added to the first container according to a proper amount. In some embodiments, a proper amount to be added can be about 0.13 cups of colorant for every 10 feet of length of a mat substrate.

At block 524, the acrylic admix can be mixed with the colorant in the first container. Mixing the acrylic admix with the colorant can equally distribute the colorant through the acrylic admix. In some embodiments, no colorant is added such that mixing the acrylic admix is not necessary.

At block 526, an acrylic cement can be added to the first container. The acrylic cement can be the same as the acrylic cement described above. For example, the acrylic cement can be a limestone and crystalline silica powder configured to solidify after being moistened. In some embodiments, the acrylic cement can be sifted. Sifting the acrylic cement may avoid clumping and allow for proper separation of the acrylic cement. For example, the acrylic cement can be sifted prior to being added to the first container. The acrylic cement can be added to the first container according to a proper amount. In some embodiments, the proper amount to be added can be about 7.5 pounds of acrylic cement for every 10 feet of length of a mat substrate.

At block 528, an oxide material can be added to the first container. The oxide material can be the same as the oxide material described above. For example, the oxide material can be aluminum oxide. In some embodiments, the oxide material can be sifted. Sifting the oxide material may avoid clumping and allow for proper separation of the oxide material. For example, the oxide material can be sifted prior to being added to the first container. The oxide material can be added to the first container according to a proper amount. In some embodiments, the proper amount to be added can be about 1.5 pounds of oxide material for every 10 feet of length of a mat substrate.

At block 530, the acrylic admix, the acrylic cement, and the oxide material can be mixed in the first container. The contents of the first container can be mixed until a homogenous mixture is achieved. For example, when the acrylic cement and oxide material are uniformly distributed through the acrylic admix.

FIG. 5D is a flowchart illustrating a method for preparing the second acrylic material to be poured into the mold.

At block 532, an acrylic admix can be added to a second container. The acrylic admix can be the same as the acrylic admix described above. For example, the acrylic admix can be an acrylic emulsion configured to be added as a bonding agent to bond cement. The acrylic admix can be added to the second container according to a proper amount. In some embodiments, the proper amount can be about 2.5 pounds of acrylic admix for every 10 feet of length of a mat substrate.

At block 534, a colorant can be added to the second container. The colorant can be the same as the colorant described above. For example, the colorant can be a color additive configured to change the color of a material or a surface. In some embodiments, the colorant can be sifted. Sifting the colorant may avoid clumping and allow for proper separation of the colorant. The colorant can be added to the second container according to a proper amount. In some embodiments, a proper amount to be added can be about 0.13 cups of colorant for every 10 feet of length of a mat substrate.

At block 536, the acrylic admix can be mixed with the colorant in the second container. Mixing the acrylic admix with the colorant can equally distribute the colorant through the acrylic admix. In some embodiments, no colorant is added such that mixing the acrylic admix is not necessary.

At block 538, an acrylic cement can be added to the second container. The acrylic cement can be the same as the acrylic cement described above. For example, the acrylic cement can be a limestone and crystalline silica powder configured to solidify after being moistened. In some embodiments, the acrylic cement can be sifted. Sifting the acrylic cement may avoid clumping and allow for proper separation of the acrylic cement. For example, the acrylic cement can be sifted prior to being added to the second container. The acrylic cement can be added to the second container according to a proper amount. In some embodiments, the proper amount to be added can be about 7 pounds of acrylic cement for every 10 feet of length of a mat substrate.

At block 540, an acrylic adhesive can be added to the second container. The acrylic adhesive can be the same as the acrylic adhesive described above. For example, the acrylic adhesive can be an acrylic emulsion. The acrylic adhesive can be added to the second container according to a proper amount. In some embodiments, the proper amount to be added can be about 1 pound of acrylic adhesive for every 10 feet of length of a mat substrate.

At block 542, the acrylic admix, the acrylic cement, and the acrylic adhesive can be mixed in the second container. The contents of the second container can be mixed until a homogenous mixture is achieved. For example, when the acrylic admix, acrylic cement, and acrylic adhesive are uniformly distributed.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A detectable warning system comprising:
   a mat substrate comprising:
     a first layer comprising cement, an acrylic material, and aluminum oxide; and
     a second layer comprising cement and an acrylic material but not aluminum oxide;
     wherein:
       the cement used in the first layer is the same as the cement used in the second layer; and
       the acrylic material used in the first layer is the same as the acrylic material used in the second layer; and
   a texture layer disposed on a top surface of the mat substrate, the texture layer comprising a plurality of texture elements formed from a second acrylic material; and
   wherein:
     the mat substrate comprises a plurality of raised portions;
     the second acrylic material comprises cement and acrylic material, wherein:
       the cement used in the second acrylic material is the same as the cement used in the first layer and the second layer; and
       the acrylic material used in the second acrylic material is the same as the acrylic material used in the first layer and the second layer;
     the plurality of texture elements comprise texture elements that are of a variety of different sizes and shapes positioned about the top surface of the mat substrate.

2. The detectable warning system of claim 1, wherein the plurality of texture elements comprise only the cement and the acrylic material.

3. The detectable warning system of claim 1, further comprising:
a first top coat layer; and
a second top coat layer,
wherein the first top coat layer is disposed directly over the texture layer, and
wherein the second top coat layer is disposed directly over the first top coat layer.

4. The detectable warning system of claim 1, wherein the plurality of raised portions comprises domes or truncated domes arranged in a linear grid.

5. The detectable warning system of claim 1, comprising a paint layer.

6. The detectable warning system of claim 1, further comprising an ultraviolet (UV) protective sealing layer disposed on a top surface of the texture layer.

7. The detectable warning system of claim 1, wherein the texture layer does not include any sand.

8. A method for making a detectable warning system comprising:
providing a mat substrate comprising a plurality of raised features uniformly positioned about a top surface of the mat substrate on a support surface of a fabrication facility;
preparing a texture element mixture; and
forming a texture layer by applying the texture element mixture as a plurality of texture elements to the top surface of the mat substrate;
wherein:
the mat substrate comprises a cement and an acrylic material; and
the texture element mixture comprises a cement and an acrylic material.

9. The method of claim 8, wherein applying the texture element mixture to the top surface of the mat substrate comprises spraying the texture element mixture onto the top surface of the mat substrate.

10. The method of claim 8, wherein:
the cement used in the mat substrate is the same as the cement used in the texture layer; and
the acrylic material used in the mat substrate is the same as the acrylic material used in the texture layer.

11. The method of claim 8, wherein a ratio of the cement and the acrylic material is about three parts cement to about one part acrylic material.

12. The method of claim 8, wherein the texture element mixture is sprayed from a sprayer having an air pressure about 80 psi, and wherein a distance from the sprayer to the mat substrate is at least about 36 inches.

13. The method of claim 8, further comprising:
applying a first top coat layer;
after the first top coat layer has dried, applying a second top coat layer; and
after the second top coat layer has dried, applying an ultraviolet (UV) protective layer.

14. The method of claim 8, wherein the plurality of raised features comprises domes or truncated domes.

15. The method of claim 8, further comprising: rolling the detectable warning system into a rolled state.

16. The method of claim 8, wherein the texture element mixture bonds with the mat substrate.

17. The method of claim 8, wherein the texture element mixture does not include any sand.

18. A mat substrate comprising:
a top surface comprising a plurality of raised portions;
a first acrylic layer comprising a cement, an acrylic material, and an oxide material; and
a second acrylic layer comprising the cement, an acrylic adhesive, and the acrylic material;
wherein the first acrylic layer defines the top surface and the second acrylic layer is configured to be positioned below the first acrylic layer when the mat substrate is in an operable position; and
the first acrylic layer is harder than the second acrylic layer.

19. The mat substrate of claim 18, wherein the plurality of raised portions comprises domes or truncated domes.

20. The mat substrate of claim 18, wherein the first acrylic layer is harder than the second acrylic layer.

21. The mat substrate of claim 18, wherein the second acrylic layer is flexible.

22. A mat substrate comprising:
a top surface comprising a plurality of raised portions;
a first acrylic layer comprising a cement, an acrylic material, and aluminum oxide; and
a second acrylic layer comprising the cement, an acrylic adhesive, and the acrylic material, but not aluminum oxide;
wherein the first acrylic layer defines the top surface and the second acrylic layer is configured to be positioned below the first acrylic layer when the mat substrate is in an operable position.

23. The mat substrate of claim 22, wherein the plurality of raised portions comprises domes or truncated domes.

24. The mat substrate of claim 22, wherein the first acrylic layer is harder than the second acrylic layer.

25. The mat substrate of claim 22, wherein the second acrylic layer is flexible.

* * * * *